US007505919B2

(12) United States Patent
Richardson

(10) Patent No.: US 7,505,919 B2
(45) Date of Patent: Mar. 17, 2009

(54) METHOD AND SYSTEM FOR EMPLOYMENT PLACEMENT

(76) Inventor: Mary L. Richardson, 5119 Yuma St., NW., Washington, DC (US) 20016

( * ) Notice: Subject to any disclaimer, the term of this patent is extended or adjusted under 35 U.S.C. 154(b) by 455 days.

(21) Appl. No.: 09/733,921

(22) Filed: Dec. 12, 2000

(65) Prior Publication Data

US 2002/0072946 A1    Jun. 13, 2002

Related U.S. Application Data

(60) Provisional application No. 60/170,352, filed on Dec. 13, 1999.

(51) Int. Cl.
G06F 17/30 (2006.01)
(52) U.S. Cl. ............................................. 705/8
(58) Field of Classification Search ............ 705/8, 705/9, 14
See application file for complete search history.

(56) References Cited

U.S. PATENT DOCUMENTS

| | | | | |
|---|---|---|---|---|
| 5,819,231 A | * | 10/1998 | Tremaine ..................... | 705/7 |
| 5,832,497 A | * | 11/1998 | Taylor ..................... | 707/104.1 |
| 5,884,270 A | * | 3/1999 | Walker et al. ..................... | 705/1 |
| 5,978,768 A | * | 11/1999 | McGovern et al. .............. | 705/1 |
| 6,311,164 B1 | * | 10/2001 | Ogden .......................... | 705/7 |
| 6,381,592 B1 | * | 4/2002 | Reuning ........................ | 707/3 |
| 6,675,151 B1 | * | 1/2004 | Thompson et al. .............. | 705/9 |
| 6,873,964 B1 | * | 3/2005 | Williams et al. ............... | 705/9 |
| 2003/0120531 A1 | * | 6/2003 | Parker ............................. | 705/8 |

OTHER PUBLICATIONS

Donnelly, George. "Networking and the Net," CFO, The Magazine for Senior Financial Executives, Aug. 1999 [retrieved from Dialog].*
LaPlante, Alice. "America's most wanted," Computerworld, Oct. 5, 1998 [retrieved from Dialog].*
www.jobasia.com (Feb. 1999, archived version).*
"Online job markets, most are middle professionals" HK Economic Times, Oct. 3, 1998, [retrieved from Dialog].*
"Internet Update Asia Feb. 19, 1999," from Newsbytes, Feb. 19, 1999 [retrieved from Dialog].*
"New Web Site Pays Job Seekers to Help Fill High Tech Job Openings" from Business Wire, Nov. 22, 1999 [retrieved from Proquest].*

(Continued)

Primary Examiner—Romain Jeanty
(74) Attorney, Agent, or Firm—Michael Bednarek; Paul, Hastings, Janofsky & Walker LLP

(57) ABSTRACT

A method and system for providing an employment placement service that provides incentives to encourage use of the employment placement service by both employers and job applicants. In a representative embodiment, the invention broadcasts job openings, presents detailed information about the employers advertising the openings, provides means for employers and applicants to exchange information (e.g., résumés), and provides incentives for both employers and job applicants to use the employment placement service. The primary components include a job listing database, an employer information database, a résumé database, and a series of graphical user interfaces that integrate the databases and give the employers and applicants access to view and manipulate the information. The system can also save user queries for various purposes.

33 Claims, 25 Drawing Sheets

OTHER PUBLICATIONS

"New Web Site Pays $50, $500 or More for Your Resume" from Business Wire, Jul. 27, 1999 [retrieved from Dialog].*

Dossin et al. "Sign-on Bonu$e$ Score for Recruiters," HRMagazine, Mar. 1990 [retrieved from Proquest].*

Ackerman, Jerry. "Industry warns of nursing shortage," The Boston Globe, Nov. 5, 1997 [retrieved from Proquest].*

Verna, Gigi. "University Hospital looks to fill up to 500 positions," Cincinnati Business Courier, Feb. 17, 1997 [retrieved from Proquest].*

Wang et al. " Is your organization's tax-exempt status at risk?" Healthcare Financial Management, 1997 [retrieved from Dialog].*

Montagu-Pollock et al. "How the French plan to conquer Asia," AsiaMoney, Nov. 1997 [retrieved from Dialog].*

Van Camp, Ann. "How to find a job online," Online, Jul. 1998 [retrieved from Dialog].*

Galewitz, Phil. "Desperate Hospitals Begging for Nurses," Palm Beach Post, Feb. 22, 1998.*

King, Julie. "They'll do anything to lure tech talent," Computerworld, Jan. 20, 1997.*

Little et al. "Recruiting employees for the health care industry," American Business Review, Jun. 1999.*

"Contingency recruiters stake out sizable claims in the executive search field," Industry Week, Aug. 6, 1979.*

Price, Margaret. "Can you score with a Contingency Recruiter?," Industry Week, Aug. 6, 1979.*

Sunseri et al. "Whether Hiring or Recruiting, Understanding Executive Recruiting," Healthcare Financial Management, May 1992.*

"Hartford Life Signs on as Founding Sponsor of Web-Based Job Program for People of Disabilities." PR Newswire, Oct. 27, 1999.*

Higginbotham, Julie. "Companies Ante up for Employees," R & D, Sep. 1999.*

International Search Report.

"JobOptions and HEALTHwindows Form New Partnership" Press release Jun. 28, 1999. [on-line], [retrieved on Mar. 17, 2001] <ULR: http://www.healthwindows.com/HealthWindows/joboptions-hw.htm> pp. 1-2.

* cited by examiner

FIG. 2d eMedJobs.com

- My eMedJobs
- First Time User
- Client Access
- Specialty Sites
- Partners/Alliances Get plugged in to the future of healthcare The Company   Help?   Mailing List   Contact Us We pay you to get a job!
(Click here for details) 271

Featured Employers
MEMORIAL MEDICAL CENTER 270

Find A Job Now

Quick Search: 1>> Select a profession
2>> Select a State
3>> ▷Search

Advanced Search: CLICK HERE 273

Relocation Resources   Send Resume   US Hospital Database

[My EmedJobs.com][The Company][Help?][Mailing List][Contact Us]
[First Time User][Client Access][Links][Partners/Alliances]
[Featured Employers][Facilities][Relocation Resources][Send Resume]

280

Legend for Flow Diagrams -
 = Process
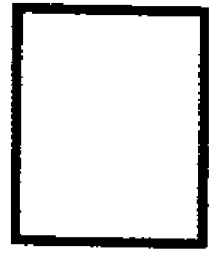 = Data
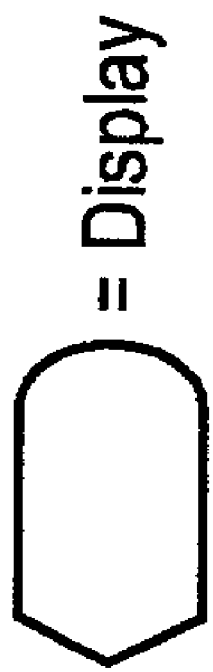 = Sort
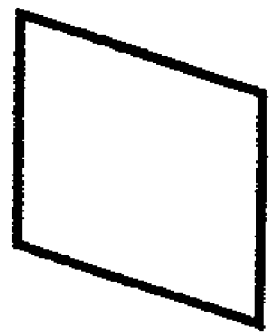 = Display
FIG. 3a emedJobs.com

Job Results Page

Your search found the following job openings. Click on a position for more details.

| Position | | | | |
|---|---|---|---|---|
| Staff Nurse | Burlington | NC | Alamance Regional Medical Center | 20,000.00 25,000.00 |
| Nursing Assistant | Winston-Salem | NC | Wake Forest University Baptist medical Center | NURSES AIDE POSITION IN INTERMEDIATE NURSERY AREA | 25,000.00 32,000.00 |
| Staff Nurse | Winston-Salem | NC | Wake Forest University Baptist medical Center | STAFF NURSE ON PEDS FLOOR | 30,000.00 38,000.00 |
| Administrative Secretary | Winston-Salem | NC | Wake Forest University Baptist medical Center | Secretary to Director | 20,000.00 28,000.00 |
| Administrative Secretary | Winston-Salem | NC | Wake Forest University Baptist medical Center | Direct reporting relationship to Director an Asst. Director | 20,000.00 25,000.00 |
| Administrative Secretary | Winston-Salem | NC | Wake Forest University Baptist medical Center | Reports directly to Director and Asst. Director | 20,000.00 25,000.00 |
| Staff Nurse | Winston-Salem | NC | Wake Forest University Baptist medical Center | | 32,000.00 38,000.00 |
| Staff Nurse | Winston-Salem | NC | Wake Forest University Baptist medical Center | | 34,000.00 40,000.00 |

|< << < > >> >|

Click BACK to return to the previous search screen.

[Home] [Job Search] [Your Resume] [Your Facility] [Your Job Listings] [Links] [About Us]

- Home
- Job Search
- Your Resume
- Your Facility
- Your Listings
- Info Links
- About Us

FIG. 5

*emedJobs.com*

Job Results Page

Here are the details for the position. Click on the facility name for details about the facility.

STAFF Nurse
Salary from: $30,000 to: $38,000 Full Time
Experience: 5+
Education: BSN
Shift: D/E
Flex Shifts: N/A
Contact:

Description
STAFF NURSE ON PEDS FLOOR

University Medical Center —— 602

Click BACK to choose from other job openings.

- Home
- Job Search
- Your Resume
- Your Facility
- Your Listings
- Info Links
- About Us

[Home] [Job Search] [Your Resume] [Your Facility] [Your Job Listings] [Links] [About Us]

Facility Results Page emedJobs.com

Your search found the following facilities. Click on a facility for more details.

| Employer | City | State | |
|---|---|---|---|
| ABC Regional Medical Center | Burlington | NC | 150-299 |
| ABC Cottage Rehabilitation Hospital | Winston-Salem | NC | 0-149 |
| ABC Human Services | Winston-Salem | NC | 0-149 |
| Charter ABC of Winston-Salem | Winston-Salem | NC | 0-149 |
| ABC Greensboro Behavioral Health System | Greensboro | NC | 0-149 |
| ABC General Hospital - Thomasville | Thomasville | NC | 150-299 |
| ABC County Hospital | Mocksville | NC | 0-149 |
| ABC Hall | Greensboro | NC | 0-149 |
| ABC Memorial Hospital | Winston-Salem | NC | 600+ |
| ABC Regional Health Sysytem | High Point | NC | 300-599 |

[ |< ] [ << ] [ >> ] [ >| ]  1/3

Click BACK to return to the previous search screen.

- Home
- Job Search
- Your Resume
- Your Facility
- Your Listings
- Info Links
- About Us

[Home] [Job Search] [Your Resume] [Your Facility] [Your Listings] [Links] [About Us]

Edit Job Opening Details — Circles of Care — eMedJobs Home

| Record 1 of 1 | Add New Job | Save | Delete | Reset |

| Title | Your Job Number | Department | Date Opened | Employer | Part Time |
|---|---|---|---|---|---|
| test 1 | | Psychiatric | 12/01/1999 | 12/01/1999 | |

- Job Title: test 1
- Your Job Number (if any):
- Job Description: Will head up a team of 6 nurses and 4 CNAs.
- Job Class: Nursing
- Job Search Class: Head Nurse
- Employer: Circles of Care
- Department: Psychiatric
- Part Time: ☐
- Part Time Hours: 0
- Start Pay From: 0
- Start Pay To: 0

| | |
|---|---|
| Total Leave Days | 24 |
| Relocation Offered | ☑ |
| Sign Bonus Amount | 3000 |
| Tuition Reimbursement | ☑ |
| Experience Required | N/A ▽ |
| Education Required | N/A ▽ |
| Shift Type | N/A ▽ |
| Flex Type | N/A ▽ |
| Email Address | |
| Contact | Mary Ellen Smith ▽ |
| Date Opened | 12/01/1999 |
| Date Closed | |
| Reason Closed | N/A ▽ |

*Field below are Read Only (Maintained by system)*

| | |
|---|---|
| Date Entered | 12/01/1999 |
| Entered By | nm-emj ▽ |
| Last Updated | 12/01/1999 |
| Last Updated By | nm-emj ▽ |
| EMJ Job ID | 5582 |

[Add New Job] [Save] [Delete] [Reset]
[New Filter] [Clear Filter] [List View] [Details View] [Both Views]

FIG. 12b

Edit Employer Details

Welcome Norman, here are the facilities you have edit rights for.

Departments
Job Openings
eMedJobs Home

|< | << | < | Record 1 of 4 | > | >> | >|

[Add New Facility] [Save] [Delete] [Reset]

| Name | Street | Street 2 | City | State | Zip | ID | Phone | F |
|---|---|---|---|---|---|---|---|---|
| Medical Center | 12 Medical Dr | | Jacksonville | FL | 32207 | 853 | XXX-202-2000 | 9 |
| ABC Hospital | 13 Hospital Dr | | Fort Lauderdale | FL | 33301 | 851 | XXX-463-4321 | 9 |
| General Medical Center | 14 Medical Ave | | Fort Lauderdale | FL | 33316 | 866 | XXX-355-4400 | 9 |
| Facility Care | 15 Care Rd | | Melbourne | FL | 32901 | 876 | XXX-722-5200 | 4 |

Employer Name: Medical Center
Street: 12 Medical Dr
Street 2:
City: Jacksonville
State: Florida
Zipcode: 32207
Account Status: N/A
Facility Type: Hospital
Main Phone: XXX-202-2000
Main Fax: XXX-202-2285

FIG.13a

Elder Care Center ☐
Flex Options [4x10 ▽]
Pension Options [401k ▽]
Last Updated [09/14/1999 8:52:21 AM]
Last Updated By [nm-emj ▽]
Employer ID 853

[Add New Facility] [Save] [Delete] [Reset]

[Customer Service]

Departments
_____
[Home] [Job Search] [Your Resume] [Your Facility] [Your Job Listings] [Links] [About Us]

FIG.13c

Edit Department Details

Medical Center

Department Information Items
Job Openings
eMedJobs Home

|< << < > >> >|   Record 1 of 14   Add New Dept   Save   Delete   Reset

| Department | Size | Beds | Staff | Email | Homepage | Department Description | Teaching |
|---|---|---|---|---|---|---|---|
| Cardiac Care Unit | 0 | 0 | 0 | | | | false |
| Emergency Department | 0 | 0 | 0 | | | | false |
| Intensive Care Unit | 0 | 0 | 0 | | | | false |
| Labor & Delivery | 0 | 0 | 0 | | | | false |
| MedSurg Nursing/General | 0 | 0 | 0 | | | | false |
| Neonatal Intensive Care Unit | 0 | 0 | 0 | | | | false |
| Operating Room | 0 | 0 | 0 | | | | false |
| Pediatric Intensive Care Unit | 0 | 0 | 0 | | | | false |
| Pediatrics | 0 | 0 | 0 | | | | false |
| Post Anesthesia Care Unit | 0 | 0 | 0 | | | | false |
| Psychiatric | 0 | 0 | 0 | | | | false |
| Radiology | 0 | 0 | 0 | | | | false |
| Respiratory Therapy | 0 | 0 | 0 | | | | false |
| Telemetry Unit | 0 | 0 | 0 | | | | false |

1/1

Department: Cardiac Care Unit ▽
Department Size: Small ▽
Number of Beds: 0
Primary Contact: Cathy Jones ▽
Email:

FIG. 13d

Homepage

Department Description

Teaching Deaprtment ☐

| Add New Dept | Save | Delete | Reset |

| List View | Details View | Both Views |

Department Information Items

[Home] [Job Search] [Your Resume] [Your Facility] [Your Job Listings] [Links] [About Us]

FIG. 13e

METHOD AND SYSTEM FOR EMPLOYMENT PLACEMENT

This application claims the benefit of the filing date of U.S. Provisional Application No. 60/170,352, filed Dec. 13, 1999, which is hereby incorporated by reference in its entirety.

BACKGROUND

1. Field of the Invention

The present invention broadly relates to the field of electronic commerce and to global network job placement services. More particularly, the present invention relates to a system and method for gathering and disseminating information about employers, employment openings, and prospective employees, and a system and method for providing incentives to the prospective employees and employers encouraging the use of the employment service.

2. Background of the Invention

Fueled by a robust economy and a decreasing pool of qualified applicants, employers today expend considerable resources on attracting, screening, and hiring employees to fill manpower needs. Faced with staffing shortages, employers must evaluate their needs, advertise such needs to reach as many qualified recruits as possible, and screen potential employees through burdensome hiring interviews, all typically on very short notice. Further compounding this tedious process, employers searching for employees with highly specialized skills suffer from a limited number of qualified personnel, especially when restricted to a specific geographic region.

Since the advent of print media, the traditional method of job placement has been through classified advertisements. Although these newspaper advertisements may be sufficient for one-time searches for recruits in a particular location, advertisements in a single newspaper or series of newspapers fail to meet the needs of today's global economy, in which large regional, national, and even international employers are continually looking for employees. What is more, placing classified advertisements in newspapers is an expensive undertaking, often constituting an employer's single largest recruiting expense. Not surprisingly, most newspapers derive more than half of their revenue from classified advertisements.

In light of the great expense and limited effect of print advertisements, employers have embraced the global computer network, or "Internet," for its powerful ability to gather and disseminate information. In the context of employment placement, early uses of the technology involved simply posting job openings on employer's individual websites. Although this technique avoids the cost of classified advertisements, it requires job seekers to visit individual websites without really knowing if a position is available. In addition to being time-consuming for the recruit, this employment placement method is unreliable for the employer, because the employer has no way of assuring its advertisement is reaching enough qualified personnel.

Seeing the need for centralized job listings, the next step in the evolution of Internet employment placement was to establish large websites that post open positions for multiple companies. These Internet job sites feature extensive lists of job openings organized by such criteria as company, location, and field of employment. Examples of such Internet job sites known in the prior art are HotJobs.com™, Hire.com™, Jobs.com™, JobOptions™, Monster.com™, CareerBuilder Network™, CareerPath.com™, America's Job Bank™, and IdealJobs.com™. Although some sites are free to employers, most typically charge for each listing or, perhaps, charge a monthly or annual fee. Through advertisement, each Internet job site strives to attract as many visits by potential applicants as possible. These advertisements, combined with the steadily increasing Internet usage by job applicants, enable employers to broadcast openings to many qualified applicants with relatively little effort and resources.

In addition to posting openings, some Internet job sites offer additional services that aid an employer's search and hiring process. Some sites give employers special access through which to directly create and edit job listings. Some sites provide means for applicants to forward résumés to the employers and, in turn, provide employers with tracking tools that organize incoming résumés into categories. Typically, the sites provide screening and searching tools that help employers target the most qualified recruits. Some sites offer anonymous résumé postings to accommodate a job seeker who does not want her current employer to know about her job search. Finally, some sites provide files in which to keep notes on individual recruits, such as whether a recruit has been contacted, interviewed, or rejected.

Related to Internet job sites, Internet recruiting services further expand an employer's reach by providing means to post open positions to several Internet job sites, while only having to enter the information once. Yahoo Recruiter™ is one example of such an Internet recruiting service. Once positions are posted, the recruiting service in turn collects the incoming résumés from the various job sites and organizes them into a single database for the employer. These Internet recruiting services therefore offer the advantage of a central place to manage the process of posting positions and filtering résumés.

Despite the many conveniences Internet job sites and recruiting sites provide, there are still significant drawbacks. First and foremost, employers have no guarantee that the fees they pay will result in the finding and hiring of a recruit. In fact, a considerable number of job listings languish on the job sites, costing the employers money and producing no results. Through advertisements and offers of ancillary job search services (such as résumé writing software), the Internet job sites attempt to attract as many applicants as possible. However, no single Internet job sites offer a unique incentive that would persuade an applicant to use its service instead of another.

Second, typical job listings provide candidates with only a limited amount of information about the position and an even more limited amount of information about the employer. Some job sites do offer hyperlinks to the employer's website. However, these hyperlinks require the candidate to exhaustingly browse the employer's website looking for recruiting information that is organized differently on each website. Such an inconvenience results in the candidate's losing patience and abandoning the search, thereby leaving the employer with no return on its investment.

Also, current Internet job sites typically use the same basic approach for all types of job openings. It is not surprising, therefore, that these "one size fits all" sites are not tailored to fit the specific needs of many professions.

Consider, for example, healthcare professionals such as hospital nurses. Unlike most other professions, hospital nurses have a skill set that is easily transportable. Since hospitals, unlike most service businesses, do not have a steady core of repeat business, it is easy for a nurse to take his or her skill set from one hospital to another or from one region to another. Thus, nursing is especially well-suited to temporary staffing. In contrast, other professions, such as engineering, require a significant investment in time to acclimate a new employee to the nuances of a new job. For this reason, one size fits all job websites are not optimal.

Thus, a third drawback is the inability of current Internet job sites to satisfy the needs of highly specialized fields, such as healthcare. Typically, healthcare job seekers desire a quick, easy to use service that presents information about healthcare facilities (e.g., hospitals and medical clinics) and their position openings in a clear and uniform manner. The information must be concise, addressing the concerns most job seekers express when searching for a job. For example, in the healthcare context, pertinent information would include such facts as the number of beds in a particular unit, the number of operating rooms, whether the facility has a trauma center, and whether the facility is a teaching hospital. In effect, the job seeker desires an employment service that offers not only job listing abilities, but integrates the postings with a data warehouse filled with information on employer facilities. This integration would enable the job seeker to focus on specific employer facility criteria and formulate quick, targeted searches.

From the employer's perspective, an employment service that accommodates highly specialized fields saves money. Because the job applicants are more focused and can better understand the needs of the employer's facility in reference to their own, such a specialized employment service integrated with a data warehouse appreciably reduces the time and effort employers waste on unqualified and incompatible applicants.

SUMMARY OF THE INVENTION

The present invention is a method and system for providing an employment placement service. Broadly stated, the present invention broadcasts job openings, presents detailed information about the employers advertising the openings, provides means for employers and applicants to exchange information (e.g., résumés), and provides incentives for both employers and job applicants to use the employment placement service. The primary components of the present invention are a job listing database, an employer information database, a résumé database, and a series of graphical user interfaces that integrate the databases and give the employers and applicants access to view and manipulate the information.

In the preferred embodiment of the present invention, incentives encourage use of the employment placement service by both employers and job applicants. For employers, the incentive is a billing structure that only charges for results. Specifically, the present invention provides unlimited job listings and charges employers only for successful job listings that result in hirings. Optionally, such charges attach only to job listings for high demand, or "critical hire," positions, while the fulfillment of other, non-critical positions occurs free of charge. Thus, the employer places advertisements for free and pays an employment placement fee only if their recruiting efforts are successful. As another incentive to use the service, the present invention furnishes the employer with means for advertising its business and facilities to potential employees, by giving job applicants access to the employer information database.

As an incentive for the job applicant, a representative embodiment of the present invention provides a signing bonus if 1) the job applicant uses the service to locate and contact an employer, and 2) if the employer hires the job applicant for a critical hire position. This signing bonus is paid from the fees the employer pays for a successful job listing. In addition to critical hire positions, the present invention also encourages applicants for non-critical positions to use the service by offering weekly prize drawings for all applicants who have started employment during a particular week in a position located on the employment service. The employment service pays for the prizes using, for example, a portion of the monthly subscription fees (if applicable) or revenues from filled critical hire positions. Prizes could include anything from watches and other personal gifts to vacations. The magnitude of the prize necessarily depends on the number of employers subscribing to the employment service.

Thus, the present invention ensures a successful employment placement by offering incentives on both sides of the transaction. Employers pay only if job listings are successful, while applicants are paid to make those job listings successful. The net result, provided by the present invention, is the increased use of the employment service and, consequently, increased advertising fees and profits for the provider of the employment placement service.

Another important aspect of the present invention is the integration of the job listing database and the employer information database. Unlike the prior art, which provides limited employer information and tedious hyperlinks, the present invention marries the job listing resource with a vast body of information about each employer. For each job listing, an applicant can click through the employer name and receive uniform employer criteria, as well as narratives that further explain the business of an employer (e.g., company history, culture, facilities, and benefits). The employer information database includes this information for all employers of a particular field, e.g., all hospitals, and not just for the employers that post job listings through the employment service. Thus, an applicant has a central website through which to search position openings, conduct research on the associated employers, and contact those employers to proceed with the hiring process. By eliminating the need to browse hyperlinks, the present invention increases the chance that an applicant will finish a search and eventually contact an employer.

Related to this integration of database information, another important aspect of the present invention is the ability of the graphical user interfaces to access and manipulate information from the databases, and to present that information in a clear, concise form. This aspect strongly appeals to applicants and employers in specialized or technical fields, such as the information technology or healthcare fields. In these fields, because the employers have specific needs that only a few specialized applicants can fill, presenting only the information necessary for finding a match is critical. The present invention summarizes the employer information an applicant would find most important in choosing a position and attaches that information to each of the employer's job listings. Thus, the job applicant need only read the listing and click on the employer to obtain all of the information necessary for making a decision.

For example, in the healthcare industry, consider an operating room nurse looking for employment in a hospital with a trauma center in a particular city. After locating and reviewing a job listing in that city for an operating room nurse that relates basic information about the position, the nurse applicant can then click on the hospital that posted the advertisement. Immediately, the present invention displays the hospital information most important to an applicant's job search, including whether the hospital has a trauma center. Additionally, when the nurse applicant reviews other postings and the associated employer information, the same critical information is presented in a uniform manner such that the applicant easily locates and absorbs the information and effortlessly compares job listings and employers to each other.

In a preferred embodiment, the present invention provides means to search the databases, by both employers and applicants. The information in each database is stored in categorized, searchable fields. Thus, to conduct a search, the present invention prompts the employer or applicant with a graphical user interface asking for criteria in each field. Employers can search the job listing database, the employer information database, and the résumé database. The applicants can search the job listing database and the employer information database.

According to a preferred embodiment, the present invention also provides a unique résumé service by integrating the graphical user interfaces and the résumé database. The résumé database maintains specific information on current and past applicants. Upon registration with the service, a graphical user interface prompts an applicant for basic contact information (e.g., name, address, and telephone number), as well as criteria specific to the applicant's field of employment, such as education, certifications, and technical experience. The intent of the résumé service is not to compose traditional, formal résumés, but rather to assign specific applicant qualifications and preferences that can be searched by employers or compared to employers' posted requirements to identify matches. Essentially, the résumé service constructs a profile of each applicant based on searchable criteria. In this manner, an employer can simply identify a particular profile that meets the requirements of a position opening and look for applicants meeting that profile.

At any time, an applicant can access her résumé and update the information. To the extent the résumé is constructed along a template that includes standard fields, the applicant can update the résumé by telephone or facsimile, or other forms of messaging. Indeed, one aspect of the present invention is the provision of standardized options for entry in the required fields so that the résumé may be updated through pull down menus or touch tone selections or messaging.

In addition, the applicant can mark the résumé as active (during a job search) or inactive (once the applicant is hired). This feature allows an applicant to use the employment service repeatedly without having to enter résumé information each time. Instead, after initially entering the information, finding a job, and marking the résumé as inactive, later when the applicant is searching for another job, she only has to update the résumé with the latest information and mark it active. Activating the résumé allows employers to view the information and enables the matching feature (described below) between employer job listings and résumés.

Another aspect of the present invention provides electronic mail ("email") correspondence between the applicant and the employer, and between the employment service provider and both the employer and the applicant. Once an applicant has located a posting in which she is interested, a graphical user interface provides an email option that enables the applicant to send a note to the employer. In response, the employer can reply to the applicant with email arranging further hiring steps (e.g., a personal interview).

In addition to employer-applicant communication, the present invention also provides an email notification service between the employment service provider and the employer or applicant. This service works in conjunction with the search functions of the present invention. Specifically, if a search by an employer returns no matching résumés or if a search by an applicant returns no matching job listings, the email notification service stores in memory the search criteria and the identity and email address of the searcher (employer or applicant). Later, if a job listing or résumé matching the search criteria is entered into the employment service (or is activated), the employment service provider emails the employer or applicant to report that a match has been found.

Moreover, in accordance with an optional aspect of the present invention, data concerning queries to the system may be stored in memory and analyzed using statistical analysis and other data mining techniques to provide information as to the demand for certain specialties or qualifications, or for certain employer criteria. Such information is useful to the applicant, the employers, and the system operator. The employers and the system operator may, for example, use the information to determine an appropriate bonus amount to offer for a certain specialty (i.e., the demand for a certain specialty). The employers can also use the information to determine employer criteria that applicants prefer (e.g., what employment benefits applicants desire).

Finally, in this specification and in the claims, it should be recognized that the term "computers" as used herein is intended to have the broadest possible meaning to encompass a portion of a computer, a single computer, or one or more computers in communication with each other. Indeed, one of the principal advantages of the present invention is that it can be implemented on any variety of computer network systems.

Accordingly, it is an object of the present invention to provide an employment placement service that provides employers and job applicants with incentives to use the service, and consequently, increases profits for the employment service provider.

It is another object of the present invention to provide in one location all of the job opening and employer information necessary for an applicant to decide whether to apply for a position.

It is another object of the present invention to present job opening and employer information in a uniform, clear, and concise form, such that a potential employee can easily determine if she is interested in a position.

It is another object of the present invention to collect and organize employer and applicant information in preset criteria fields that can be searched to match applicant qualifications with employer needs.

As described herein, the present invention comprises a system and method that includes at least the following significant features:

1) a billing process that provides an unlimited number of free job listings and charges employers only for job listings that result in the hiring of critical position applicants;

2) an incentive program that pays applicants with prizes or bonuses for using the employment service;

3) an employer database integrated with the job listing service so that applicants have a central website through which to search position openings, conduct research on the associated employers, and obtain all information necessary for deciding whether to apply for a position;

4) an interface, between the databases and the graphical user interface, that summarizes information that is critical to applicants of a specialized field and presents the information to the applicants in an easy to understand, uniform manner that facilitates comparisons of job openings and employers;

5) an interface, between the résumé database and the graphical user interface, that enables an applicant to create and edit a résumé tailored for specific searches in particular specialty fields;

6) an interface, between the users of the service and the employment service, that enables email communication for the purpose of establishing contact between employers and applicants;

7) a system for storing search queries and analyzing stored queries to assess, for example, relative demand for certain specialties; and 8) the ability to link the website and its databases to related specialty websites devoted strictly to information and data useful to members of specialized occupations.

These and other objects and advantages of the present invention are described in greater detail in the detailed description of the invention, the appended drawings, and the attached claims. Additional features and advantages of the invention will be set forth in the description that follows, will be apparent from the description, or may be learned by practicing the invention.

DESCRIPTION OF THE DRAWINGS

FIG. 2d is an image of a home page screen, according to an alternate representative embodiment of the present invention.

FIG. 3a is a legend explaining flowchart symbols.

FIGS. 4-10 are images of the various screens that the system provides to a potential employee during browsing of and interaction with the website, according to a representative embodiment of the present invention.

FIGS. 12a-12c illustrate a preferred embodiment of the web pages through which the job opening is edited.

FIGS. 13a-13e illustrate a preferred embodiment of the web pages through which the employer information is edited.

DETAILED DESCRIPTION OF THE INVENTION

The present invention is a system and method for providing an employment placement service that gathers and disseminates information about employers, employment openings, and prospective employees, rewards prospective employees for filling the employment openings, and charges employers only for advertising that results in hirings.

As an overview of the present invention, the following discussion describes the architecture and components of the system, the method of billing the employers and rewarding the job applicants, and the method of operating the website and the graphical user interfaces. The following description of a system architecture and a method for implementing an employment placement service within that architecture are examples of preferred embodiments of the present invention. Although the present invention is applicable to any employment placement service with access to employer and applicant databases, the following description and schematics trace the operation of the present invention in the context of the healthcare field. While the method described herein and illustrated in the figures contains many specific examples of information flow steps, these steps should not be construed as limitations on the scope of the invention, but rather as examples of information flow steps that could be used to practice the invention. As would be apparent to one of ordinary skill in the art, many other variations on the system operation are possible, including differently grouped and ordered method steps. Accordingly, the scope of the invention should be determined not by the embodiments illustrated in these examples, but by the appended claims and their equivalents.

System Architecture

Figure 1A:
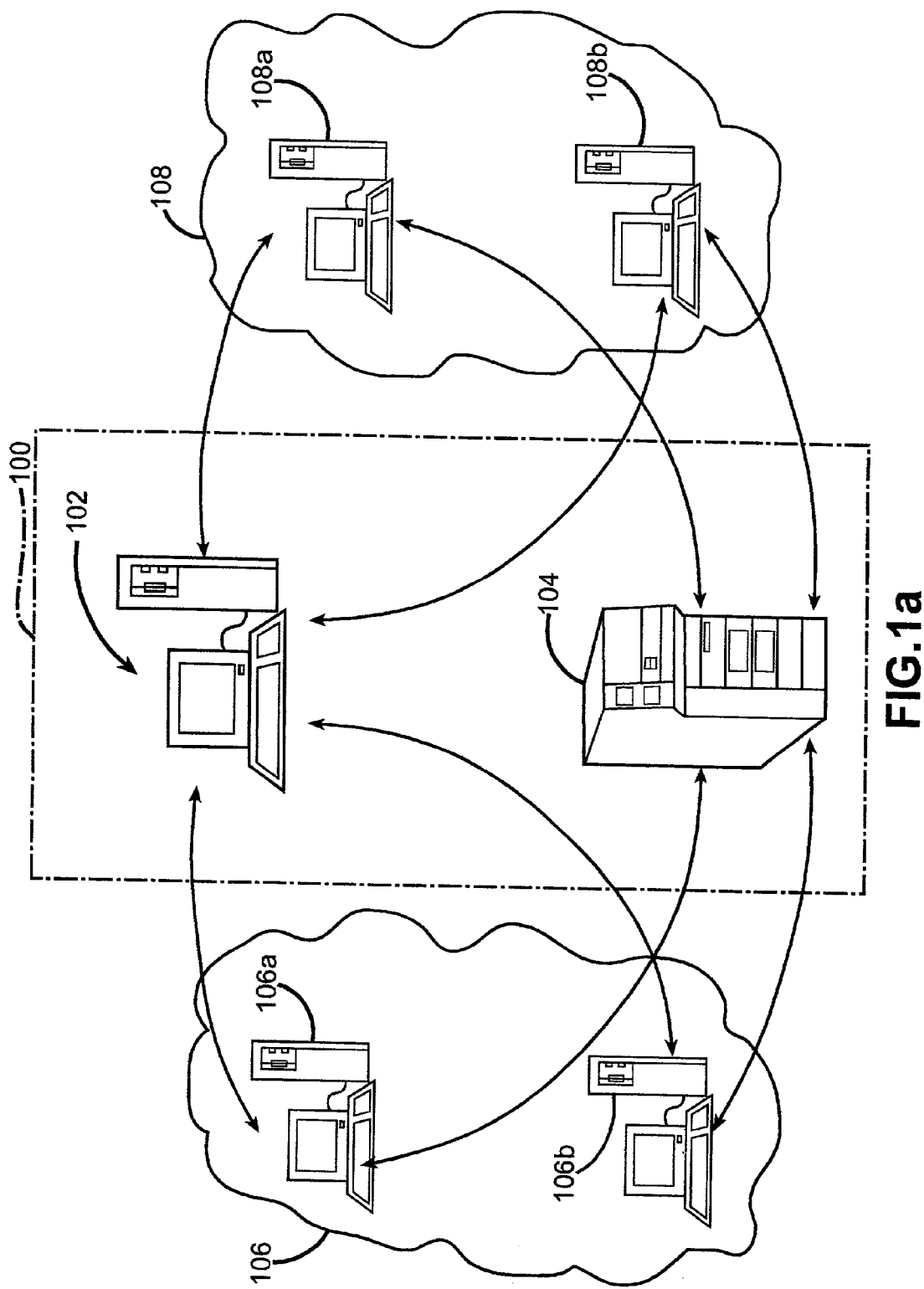
FIG. 1a is a schematic diagram of the system architecture of the present invention, according to a representative embodiment.

Referring to FIG. 1a, the present invention comprises a server 104 that contains a job listing database, an employer information database, a résumé database, and a graphical user interface software application. The server 104 is in communication with a system operator console 102 and user computers 106 and 108 through the Internet.

FIG. 1a illustrates schematically a system 100 according to a preferred embodiment of the present invention. System 100 includes a system operator console 102 operatively connected to a server 104. Server 104 stores the job listing database, the employer information database, and the résumé database. Server 104 can be a database management system. Through operator console 102, a system operator can access server 104 to enter and modify data contained therein and otherwise control the database. Although the server is illustrated as resident on a single computer, this is not essential. The server could exist on widely distributed computers linked together. Also, the server can store past queries and include software for performing statistical analysis and other data mining on the stored data to provide information to users.

In the illustrated embodiment, system 100 is implemented as a website-accessible database on the Internet for gathering and disseminating information related to the employment service. Users 106, for example users 106a, 106b, 108a, and 108b, can access database 104 via the website. A user enters the appropriate website address (e.g., URL) to obtain access to database 104. Using a series of web pages (described below), users can enter, modify, and obtain information contained in the server databases. Users 106a, 106b, 108a, and 108b are both job seekers and employers.

Figure 1B:
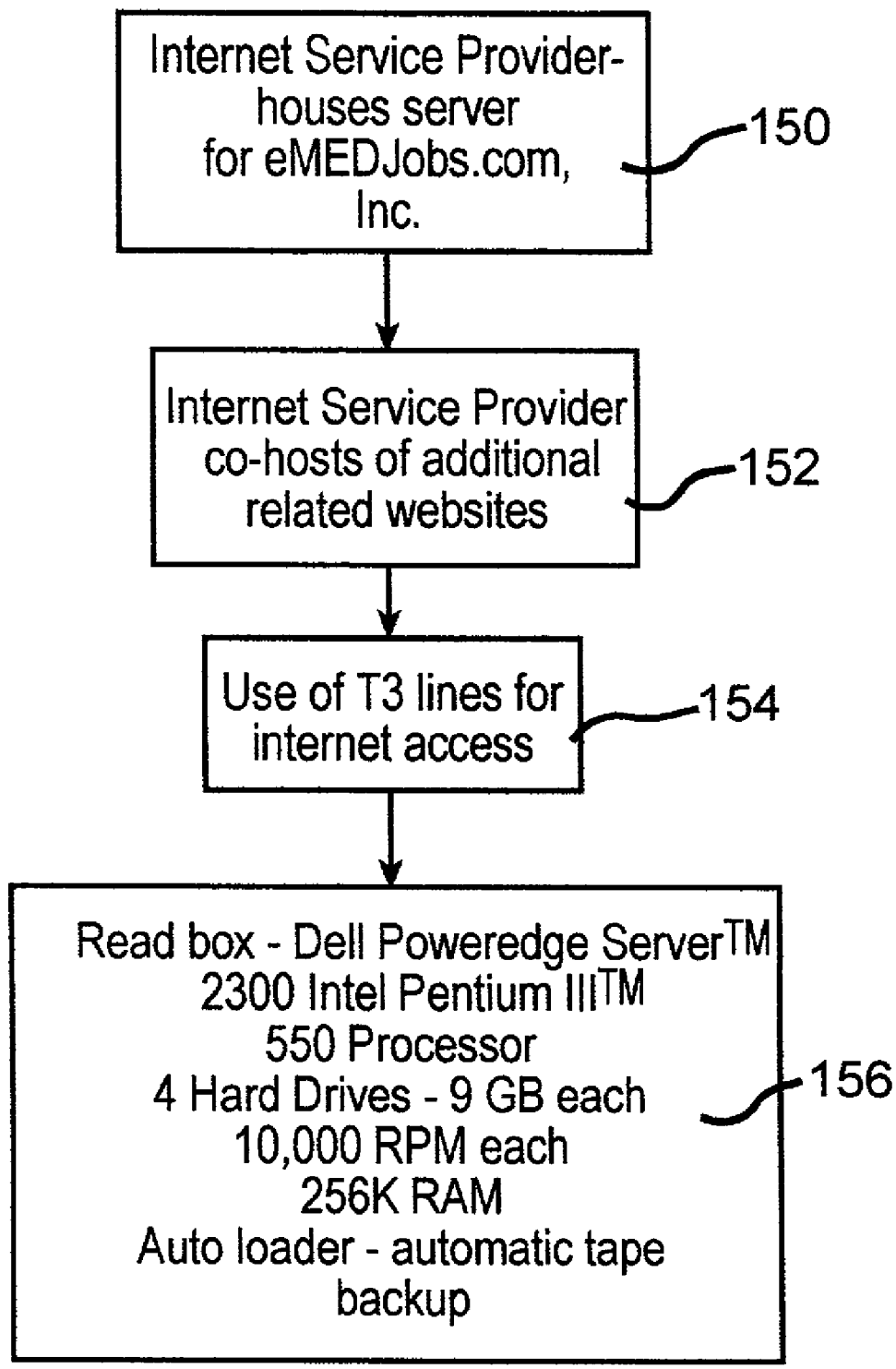
FIG. 1b is a schematic diagram of the hardware and networking configuration of the present invention, according to a representative embodiment.

According to a preferred embodiment, the hardware and networking configuration of the system is as shown in FIG. 1b. Internet service provider 150, e.g., PSINet, houses server 104 for the employment service. In addition, Internet service provider hosts additional websites 152 related to the website of the employment service. These related websites provide information regarding specialty occupations, e.g., operating room nurses, and can be accessed through the employment service web pages using hyperlinks. The server 104 for the employment service uses T3 lines 154 for Internet access. Finally, the preferred hardware specifications 156 are shown in FIG. 1b.

System Operation

The method of the present invention comprises two primary aspects: 1) the method of billing employers and providing incentives for applicants, and 2) the method of operating the website and exchanging information with the employers and applicants. The second aspect, concerning the use of the website, implements a portion of the method of the first aspect. Specifically, the present invention provides the website to collect and distribute information about job listings, employers, and applicants, and to facilitate and track interactions between employers and applicants, such that an employment service can provide the billings and incentives of the first aspect.

Billings and Incentives:

According to the preferred embodiment of the present, an employer first registers with the employment service and provides the employment service provider with general background information about the employer's business and facilities. For healthcare facilities such as hospitals, this information could include basic contact information (e.g., address, telephone number, and email), a listing of department specialties, and the number and types of employees. Preferably, the employer also provides the employment service provider with a narrative description of the hospital and its facilities to give an applicant more of a sense of the culture and work atmosphere of the employer. (Even if an employer does not register with the employment service and post job listings, the employment service obtains the information on its own and includes it in the employer information database for the benefit of the applicants.) The employment service provider then analyzes the data, categorizes the data according to specific criteria (i.e., criteria most helpful to a job seeker deciding whether to apply), and enters the data into the employer database in the searchable fields corresponding to the specific criteria.

The next step is for the employer to submit job listings for position openings. Optionally, the employment placement service can charge the employer a low monthly subscription fee, e.g., $39.95, for the privilege of entering job position listings on the website. The employment service provider applies this nominal administrative fee toward the preparation of paperwork, the maintenance of the website, and perhaps the weekly prize drawings for encouraging job seekers to use the service (described in more detail below). Preferably, however, the employment placement service does not charge a subscription fee and allows the employer to submit an unlimited number of listings without being charged for each individual listing. The employment service provider enters each job listing in the job listing database, and at the same time, marks whether the job listing is for a critical or non-critical position. A non-critical position is generally a position for which many applicants are qualified and which can be filled relatively easily, e.g., janitors, cooks, and security personnel. A critical position is generally for a specialized position that is in high demand and for which only a small pool of applicants exist, e.g., registered nurses, physician assistants, and medical technicians. The employment service provider categorizes each position because the billing and incentive programs apply differently to each.

As an alternate embodiment of the present invention, an employer can use the job listing database to store descriptions for all of the job positions of the employer, regardless of whether the employer wishes to advertise a job position or not. In effect, the employer uses the employment service provider to store its human resources data relating to job positions. Thus, if an opening does arise, the employer can simply retrieve a job position description that is already stored in the job listing database and create a job listing. This arrangement relieves the employer of the burden of maintaining the data storage and simplifies the creation of job listings.

Once openings are entered into the job listing database, a potential employee can access the website and browse the job advertisements. While browsing, the present invention encourages the job seeker to register with the employment service by offering incentives. For applicants interested in non-critical positions, the incentive is a weekly prize drawing for all non-critical position applicants who start employment with an employer during a given period, preferably a week. The applicant must start a job for which the employer had a job listing on the employment service. The prize is purchased using, for example, a portion of the monthly subscription fees (if paid by the employers) or revenues from filled critical hire positions. The prize should be substantial enough to persuade a job applicant for a non-critical position to choose the employment service of the present invention over another service with no incentives.

For applicants for critical positions, the incentive to register and use the employment service to contact an employer is a signing bonus paid when the applicant accepts a position offered by an employer with a listing on the website. The bonus should be enough to encourage the applicant to register with the employment service, to use the service in place of other Internet job sites that offer no incentives, to mention the service to colleagues, and to return to the service when looking for another position. The size of the bonus depends upon the type of the position, for instance, whether the position is in high demand or is highly compensated. For such positions, employers are willing to pay larger advertising fees. Thus, because, according to the preferred embodiment of the present invention, the employment service provider pays the bonus out of the advertising fee received from the employer, the higher the advertising fee, the higher the signing bonus can be.

An employment service provider could set a fixed advertising fee, which includes a fixed fee for the employment service provider and a fixed fee for the signing bonus. This fixed advertising fee could apply to all critical hire positions and all employers. Alternately, in another preferred embodiment of the present invention, the amount of the signing bonus is set by the employer and the fee paid to the employment service provider is an additional amount over the ordinary fee paid to the employment service provider. For example, with a higher signing bonus, the fee paid to the employment service provider could be some percentage of the bonus or could be an additional flat fee on top of the ordinary fee paid to the employment service provider. The employment service provider would set a minimum advertising fee (fee to the service provider plus the fee to pay the signing bonus), but employers would be able to raise the advertising fee to pay any desired signing bonus.

With variable signing bonuses, employers can attract applicants with larger signing bonuses, to address acute staffing shortages associated with particular job positions. Allowing employers to adjust bonuses creates a more fluid market, in which employers and applicants can easily gauge the demand for job positions and can respond accordingly. Employers can raise bonuses to attract a limited number of applicants, and applicants can avoid employers that are paying below market values.

Along these lines, the system can also be used to allow employers to bid for the services of prospective employees, especially those that are in high demand. To implement this feature, the system notifies employers that an applicant satisfying certain criteria is available by, for example, posting that applicant's résumé, or through direct notification, such as by email. Interested employers can then submit bids for the applicant's time. Bids could involve a combination of compensation, bonuses, working conditions, and the like. The applicant could then select the bid they find most attractive. In this example, the decision is left to the subjective determination of the applicant.

The variable bonus structure can provide administrative benefits for the employers as well. Specifically, because the employer pays an advertising fee, as opposed to compensating an applicant directly, the employer avoids accounting burdens such as payroll withholdings and tax reporting requirements. Although the applicant must account for the received income (bonus), the employer can simply book the advertising fee as an expense. Thus, instead of hiring an applicant, then awarding a signing bonus, and dealing with payroll withholding and reporting requirements, an employer simply pays the advertising fee up front. In addition, the employment service provider may also avoid accounting burdens, assuming the bonus paid is less than the minimum amounts at which withholding and reporting requirements apply, as dictated by applicable laws.

In an alternate embodiment of the present invention, to avoid exploitation of the bonus program by applicants who frequently change jobs, eligibility for the signing bonus is limited over a specified period, e.g., a limit of two signing bonuses per year per individual.

Having registered for the service, the next step is for the applicant to contact an employer. The employer then screens the applicant and proceeds through the hiring process, e.g., personal interviews, callbacks, and reference checks. This hiring process takes place external to the present invention.

According to the preferred embodiment, when an applicant accepts a position listed by the employment service, the applicant notifies the employment service provider. Typically, this notification is not a burden for the applicant because of the incentives noted above. However, as an alternative to the applicant's notifying the employment service provider, the employer may forward the notification. Or, if an employer deletes a listing from the job listing database, the employment service provider may assume the position was filled and can contact the employer for verification. In any case, once the employment service provider receives some notification of a hiring, the employment service provider confirms the hiring with both sides of the transaction (employer and applicant).

In some cases, an employer will advertise job listings both in the employment service of the present invention and other media, such as kiosk postings and newspaper classifieds. Thus, in some instances, the hiring employer and the employment server provider may have difficulty determining whether an applicant was located and hired through the service. For example, an applicant may see a position noted on a kiosk, apply and be hired for the position, and then later may learn of the bonus program of the employment service and try to claim a bonus. Therefore, in an alternate embodiment of the present invention, to receive a signing bonus, an applicant must reference the employment service provider when applying to an employer for a position. In other words, the applicant must inform the employer that she learned of the position opening by viewing job listings of the employment service. In this manner, the employer recognizes in advance that the applicant is expecting a signing bonus and that the employer owes the employment service provider an advertising fee to cover the bonus, thereby avoiding disputes between the three parties after a hiring.

The preferred embodiment of the present invention also includes enforcement policies that penalize employers who attempt to avoid paying advertising fees for the critical position applicants that they hire through the employment service. Conceivably, an employer could attempt to pay the bonus directly to the applicant and avoid paying the advertising fee to the service. The employment service would discover this when following up with the employer or hired employee. In response, the present invention provides that, in such a case, the employment service either bars the employer from using the service or penalizes the employer by charging more for future service.

Once the employment service provider is aware of a hiring, the present invention implements the billing and incentive features. For the non-critical position applicant, the employment service provider enters the applicant's name in the pool of hires for a particular period of time, e.g., a week, and informs the applicant of her eligibility for a prize. After the drawing, the employment service provider delivers the prize to the applicant, assuming she won.

For the critical position applicant, before delivering the incentive (signing bonus) to the applicant, the employment service provider first bills the employer for the successful hiring. The bill is for the advertising fee agreed upon by the employer and employment service provider at the time of contracting and service registration. The amount of the advertising fee depends on such factors as the market demand for a particular position and the salary associated with a particular position. The employment service provider could, for example, charge higher advertising fees for job listings listing positions that are in high demand. Once the employer pays or commits to pay the advertising fee, the employment service provider gives the signing bonus to the applicant.

Thus, through a creative incentive and billing plan, the present invention provides an essentially self-perpetuating employment service. On the front side, monetary and prize incentives attract job seekers to use the employment service instead of other traditional Internet job sites. This popularity, in turn, attracts employers to the service because of the increased exposure that advertisements receive and the heightened possibility of filling positions. In addition, the employers have little to lose in the beginning. Aside from a (possible) nominal subscription fee, the employers receive free advertising for their businesses, the right to post unlimited job listings, and pay nothing for the successful hirings of non-critical position applicants. Only when an employer hires a critical applicant does the employer pay the service provider the advertising fee. And, typically, employers are more than willing to pay for this successful result.

The incentive programs and pay-only-for-results policy also encourage repetitive use by both employers and job seekers. Thus, the employment service of the present invention provides a steadily increasing base of customers. Applicants who accept positions and receive bonuses will most certainly relate the favorable experiences to colleagues. Seeing the benefits, these colleagues will also use the service. Further, each applicant who has successfully used the service will return to it for future job searches. The same holds true for employers. Thus, the present invention uses incentives and contingent billing to provide a successful employment service that draws large numbers of job seekers and employers.

Website Operation:

The method of operating the website and exchanging information with a user depends upon whether the user is a job applicant or an employer. Accordingly, the discussion below and the corresponding flowcharts and screen images of FIGS. 2a-2b separately address the two types of access, by applicant and by employer.

Figure 2A:
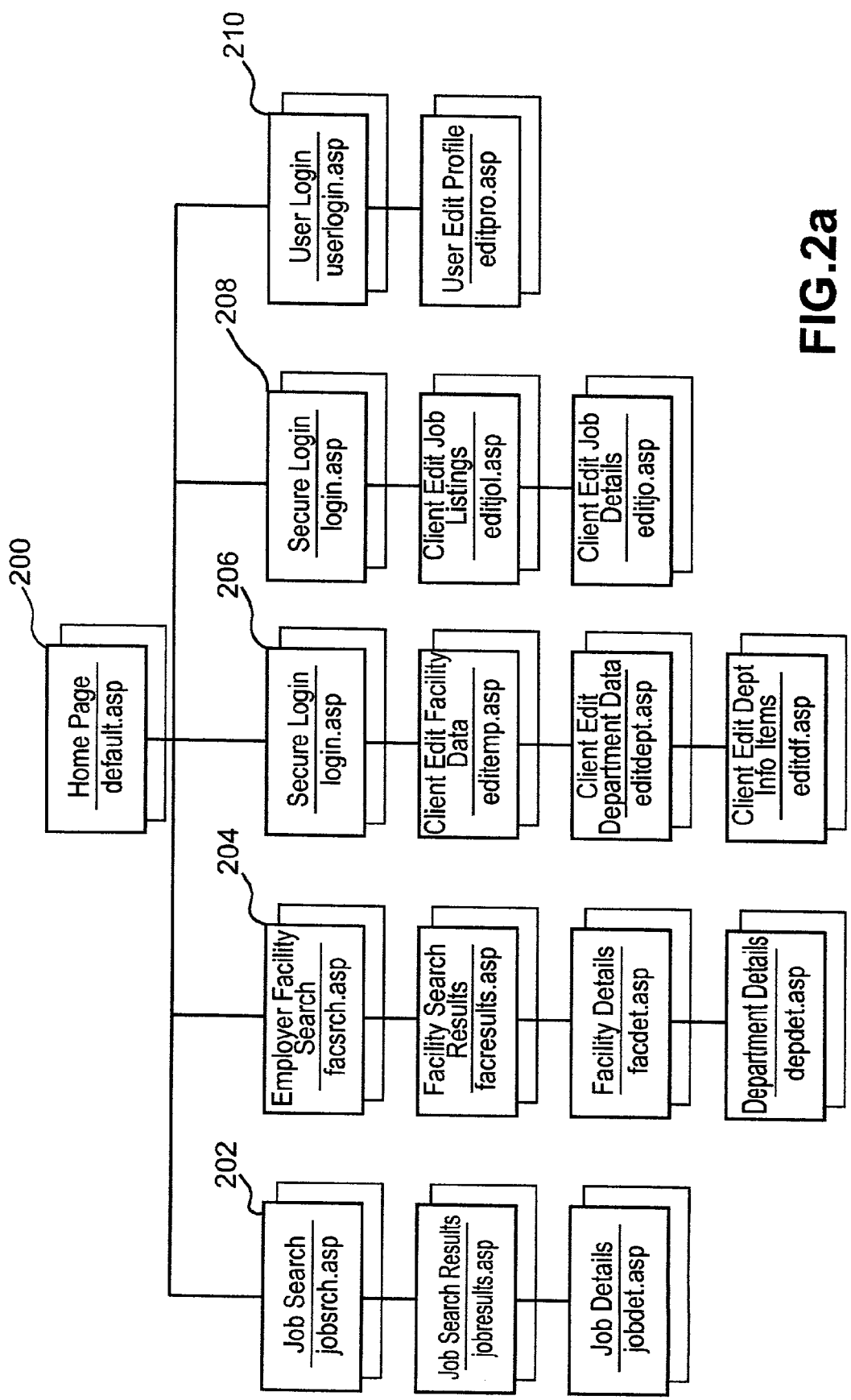
FIG. 2a is a schematic of the data access page hierarchy of the present invention, according to a representative embodiment.

As an overview, FIG. 2a illustrates a preferred data access page hierarchy (also referred to as a site map) of the present invention. When a user first enters the website, the system displays a home page, represented by the top data access page 200. As FIG. 2a shows, the user can enter five separate menu options offering the separate functions of the present invention: 1) job search 202 (corresponding to read-only access of the job listing database); 2) employer search 204 (corresponding to read-only access of the employer information database); 3) employer information entry 206 (corresponding to edit access of the employer information database); 4) job listing entry 208 (corresponding to edit access of the job listing database); and 5) applicant information entry 210 (corresponding to edit access of the résumé database). Both employers and applicants have access to the job search data access pages 202 and the employer search data access pages 204. Applicants have secured access, e.g., using a user identification and password, to the applicant information entry pages 210 to enter and revise résumé information. Finally, employers have secured access to employer information data access pages 206 and job listing entry data access pages 208 to enter and revise employer data and job listings, respectively.

Figure 2B:
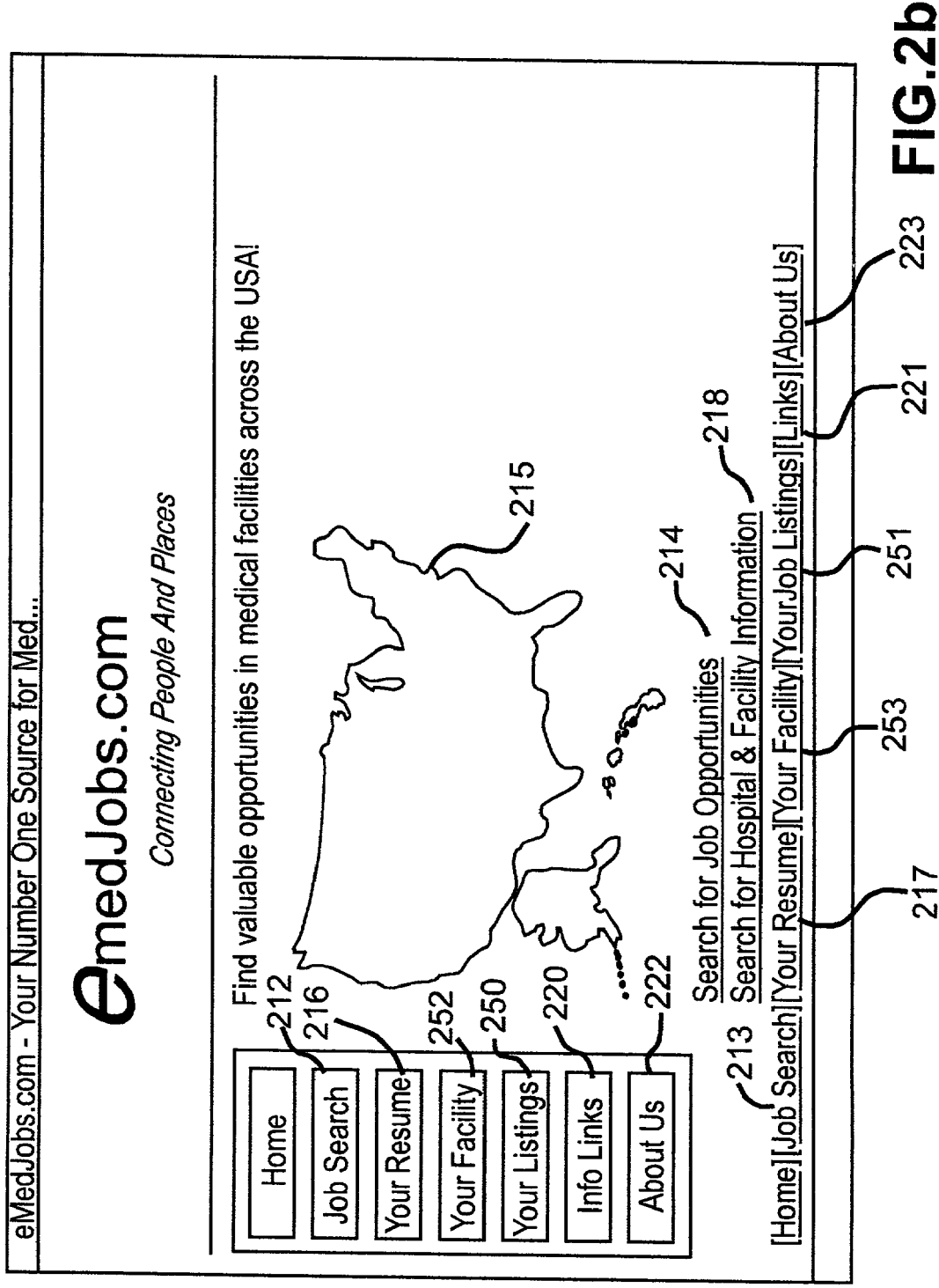
FIG. 2b is an image of the home page screen of a preferred embodiment of the present invention.

FIG. 2b shows a preferred embodiment of the home page that is displayed upon entry into the website. The home page contains introductory information regarding the site, some explanatory remarks, and a geographic map illustrating the locations served by the employment service. Preferably, the user navigates through the system using the options presented on the home page. Preferably, the home page displays to the user a number of options (e.g., in the form of buttons, or highlighted or underlined text, displayed on the home page, which are clicked-on to make a selection). Broadly, these options include functions such as searching the job listings, searching employers, entering and editing résumé information, entering and editing employer information, and entering and editing job listings. The options (buttons) on the home page correspond to the data access pages 202, 204, 206, 208, and 210 shown in FIG. 2a. Preferably, the home page features two additional buttons for information links (e.g., hyperlinks to related informational websites) and "about us" information (e.g., giving contact information and company information about the employment service provider). Also, preferably, a user can click on the map shown on the home page to focus on a particular geographic region to restrict the functions of buttons to that particular geographic region (e.g., click on the northeast United States to search for jobs in that region).

Figure 2C:
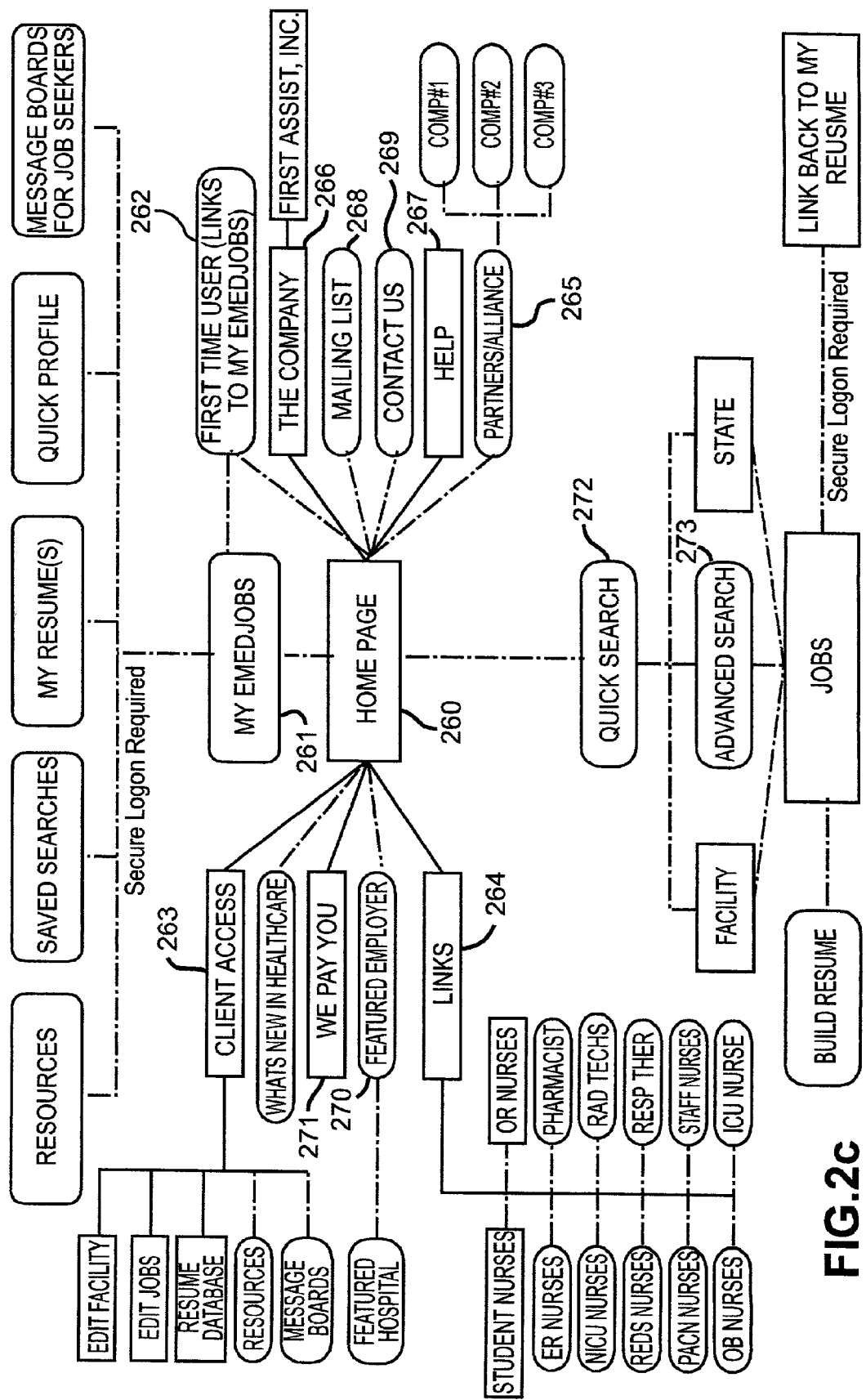
FIG. 2c is a schematic diagram of a data access page hierarchy, according to an alternate representative embodiment of the present invention.

FIGS. 2c and 2d illustrate alternate preferred embodiments of the site map and home page, respectively. This alternate site map and home page provide the same general functions described for FIGS. 2a and 2b, but do so using a slightly different site structure. Data access page 260 of FIG. 2c corresponds to the home page 280 displayed in FIG. 2d. Reference numerals 261-273 are labeled identically between FIGS. 2c and 2d to show which data access pages of FIG. 2c correspond to which options (buttons) of FIG. 2d.

FIG. 2c also illustrates additional functions accessible through the options of the home page. For example, after clicking through client access 263, a user (employer) can edit facility and job information, and can access the résumé database, resources, and message boards. Through links 264, a user can access specialty sites containing specific information for particular disciplines, such as operating room nurses, pharmacists, and respiratory therapists. Through quick search 272 and advanced search 273, a user can access the search functions of the present invention (discussed in detail below). As a final example, through My eMedJobs 261, a user (applicant) can access resources, saved searches, stored résumés, profiles, and message boards. Home page 280 of FIG. 2c also includes options for accessing relocation resources 274 (to aid an applicant in moving to a new job), sending résumés 275, and accessing hospital information 276.

Overall, the home page acts as the gateway to the remaining functions of the present invention. As mentioned above, the method by which the employment service accommodates a user depends upon whether the user is an applicant or an employer. Although initial access of the website via the home page is the same for both types of users, the method of the present invention following the click-through of the home page differs for each. Therefore, the following discussion and associated figures address each type of user separately.

In addition, although the following discussion and figures present the remaining functions of the present invention within the context of the site map and home page shown in FIGS. 2a and 2b, as one of ordinary skill in the art would appreciate, the same functions would apply equally as well to the embodiments of the site map and home page shown in FIGS. 2c and 2d.

Figure 3:
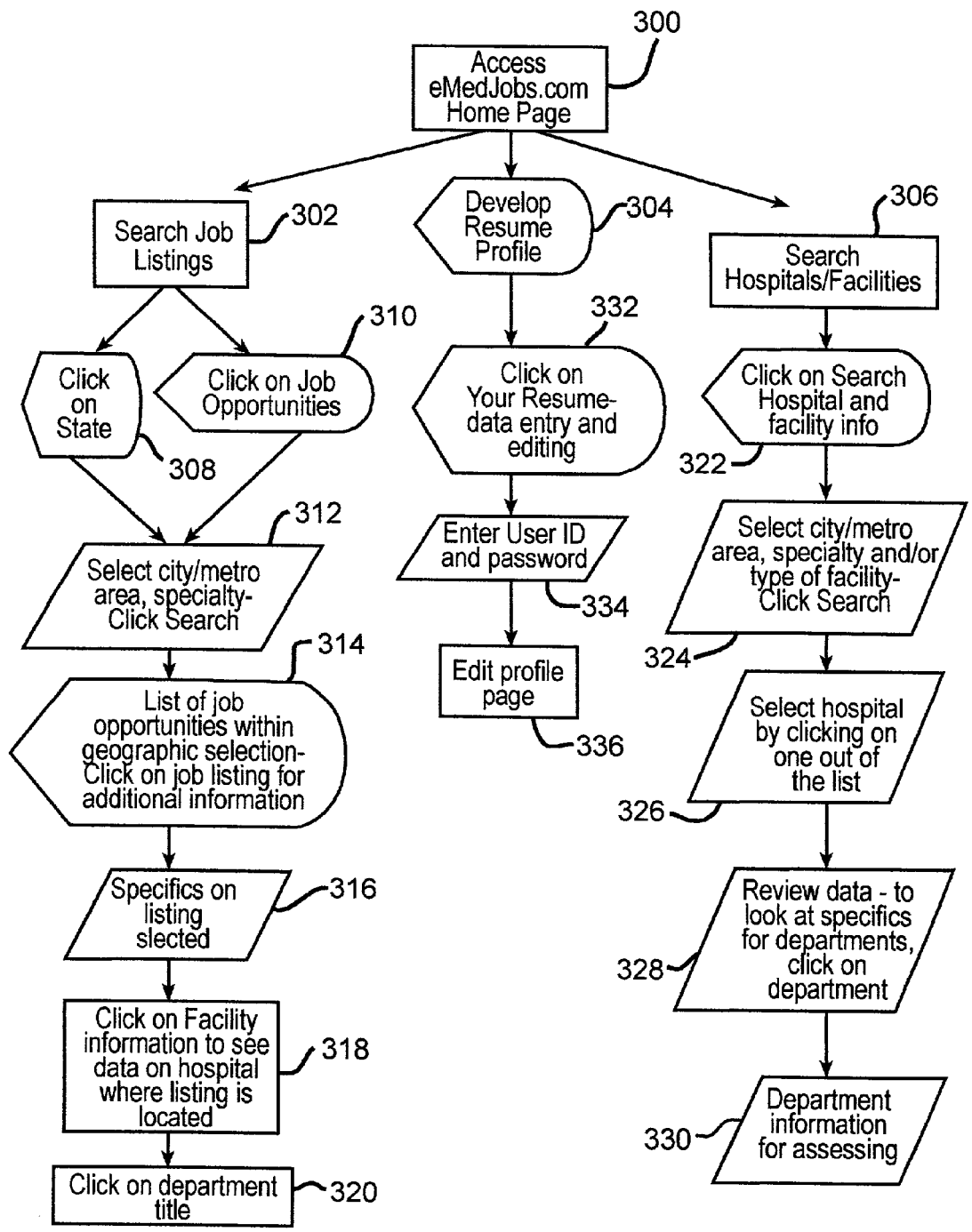
FIG. 3 is a flowchart outlining a method for access by a potential employee (applicant), according to a representative embodiment of the present invention.
Figure 4:
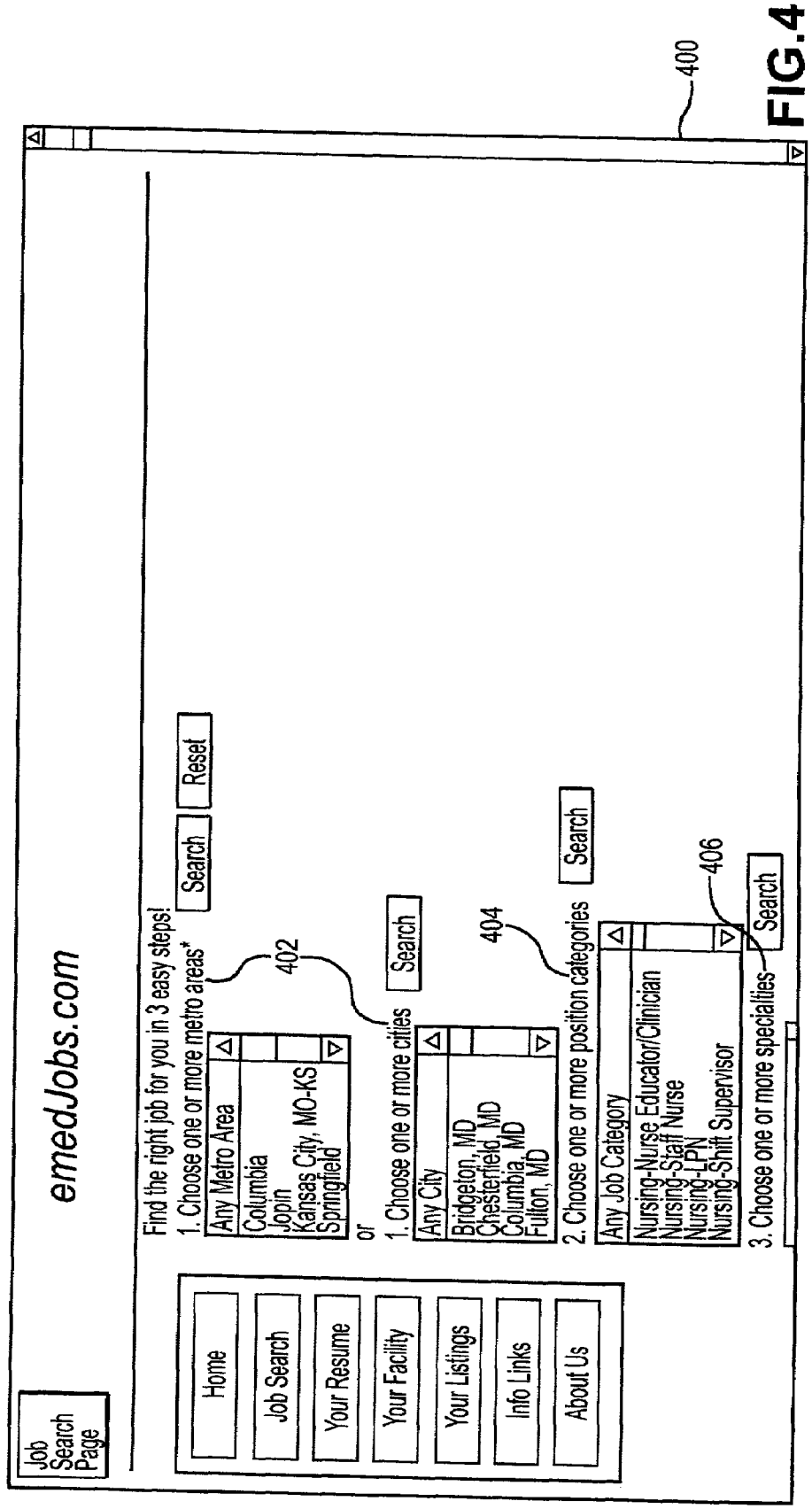

Employee/Applicant:

FIG. 3 is a flowchart illustrating the ways in which a potential employee can navigate through the website and interface with the databases. (FIG. 3a shows the legend for symbols used in the flowcharts in this application.) In FIG. 3, step 300 represents an applicant's initial access to the home page using an Internet address, e.g., eMedJobs.com. This step 300 brings the applicant to the page illustrated in FIG. 2b. From this page, the applicant can opt for one of three main functions: 1) searching the job listings (step 302) by clicking button 212, text 213, text 214, or map 215 in FIG. 2b; 2) developing a résumé profile (step 304) by clicking button 216 or text 217 in FIG. 2b; or 3) searching employers, i.e., hospitals and facilities (step 306) by clicking text 218 in FIG. 2b. Other minor functions, not shown in FIG. 3, include clicking on the information links button 220 or text 221, and the "about us" button 222 or text 223 shown in FIG. 2b. If the applicant chooses to search job listings, the website presents a job search page 400, as shown in FIG. 4. If the applicant opted for the job search function by clicking on a region or state in the map 215, the job search page 400 is restricted to that region or state. In FIG. 3, step 308 represents clicking on map 215, while step 310 represents clicking button 212, text 213, or text 214. In step 312, the applicant responds to the job search page 400 by selecting one or more metro areas or one or more cities 402, and one or more position categories 404 and one or more specialties 406. An applicant does not necessarily have to make a 15 selection for every field. However, the more criteria the applicant specifies, the more focused the search is and the fewer job listings are returned.

In step 314, the website searches the job listing database in accordance with the search criteria chosen by the applicant. As shown in FIG. 5, the website returns a job results page 500 listing the corresponding job openings 502. The listings include data such as the type of position, the city, state, and name of the employer, and the job description and salary range. The job results page 500 prompts the applicant to scroll or browse through the listings by clicking arrow buttons 504 and requests that the applicant click on a position listing for more details.

Having identified a listing in which she is interested, the applicant clicks on the listing 506. In step 316, the website returns a job details page 600, as shown in FIG. 6. Job details page 600 lists the specific requirements of the position including such criteria as experience, education, and shift assignments. The job details page 600 is formatted the same for all position such that an applicant can easily locate the information and compare listings. Job details page 600 also prompts the applicant to click on the facility name 602 to view details about the 10 facility.

Figure 7:
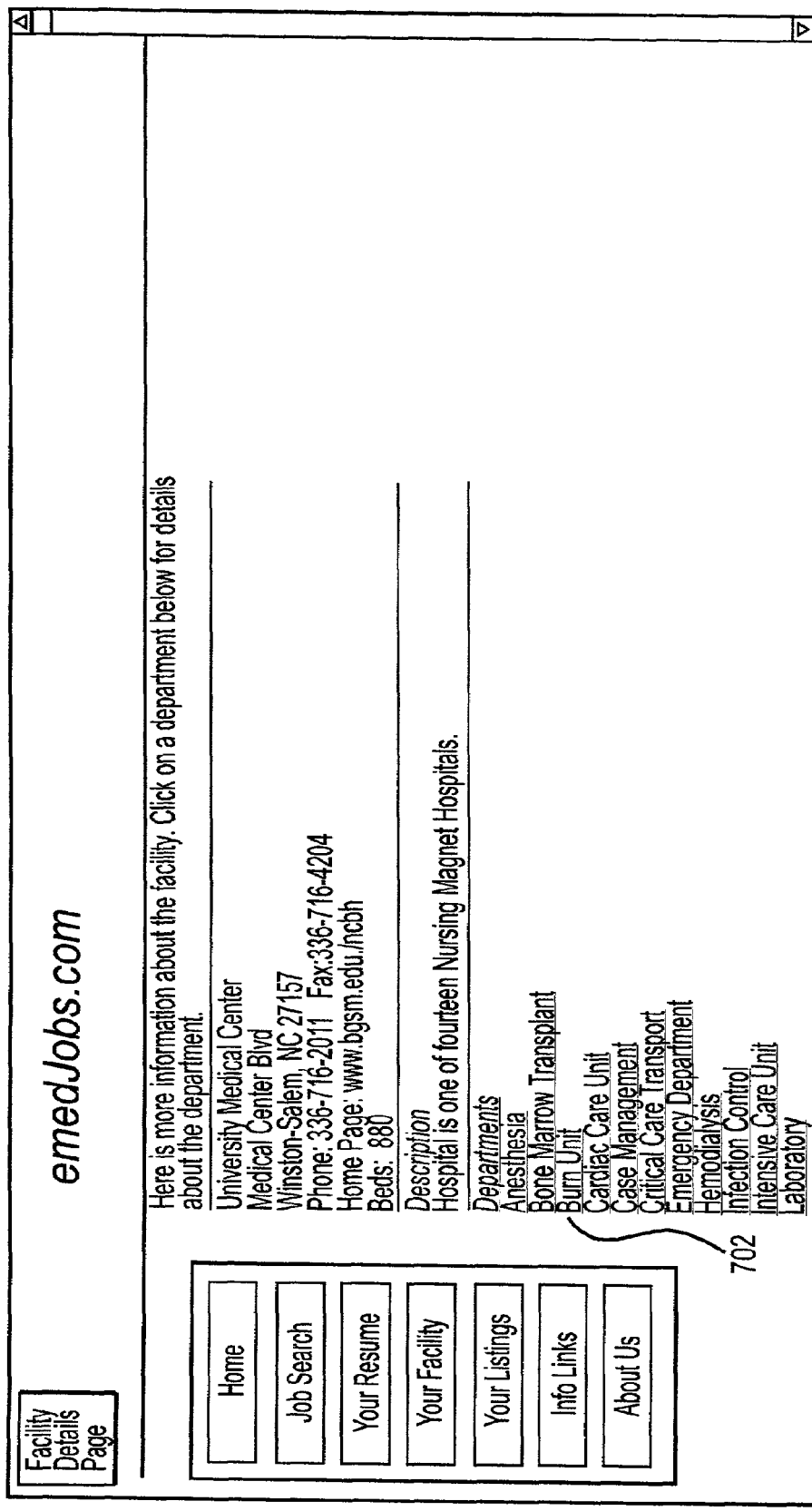

In step 318, the applicant clicks on the facility name 602 and the website returns a facility details page 700, as shown in FIG. 7. Facility detail page 700 features more information about the facility including, for example, contact information, size, departments, and a narrative description furnished by the facility. As with the other pages, facility detail page 700 is formatted the same for all employers for applicants' ease of use. In addition, facility details page 700 prompts the applicant to click on department titles to learn more information.

Figure 8:
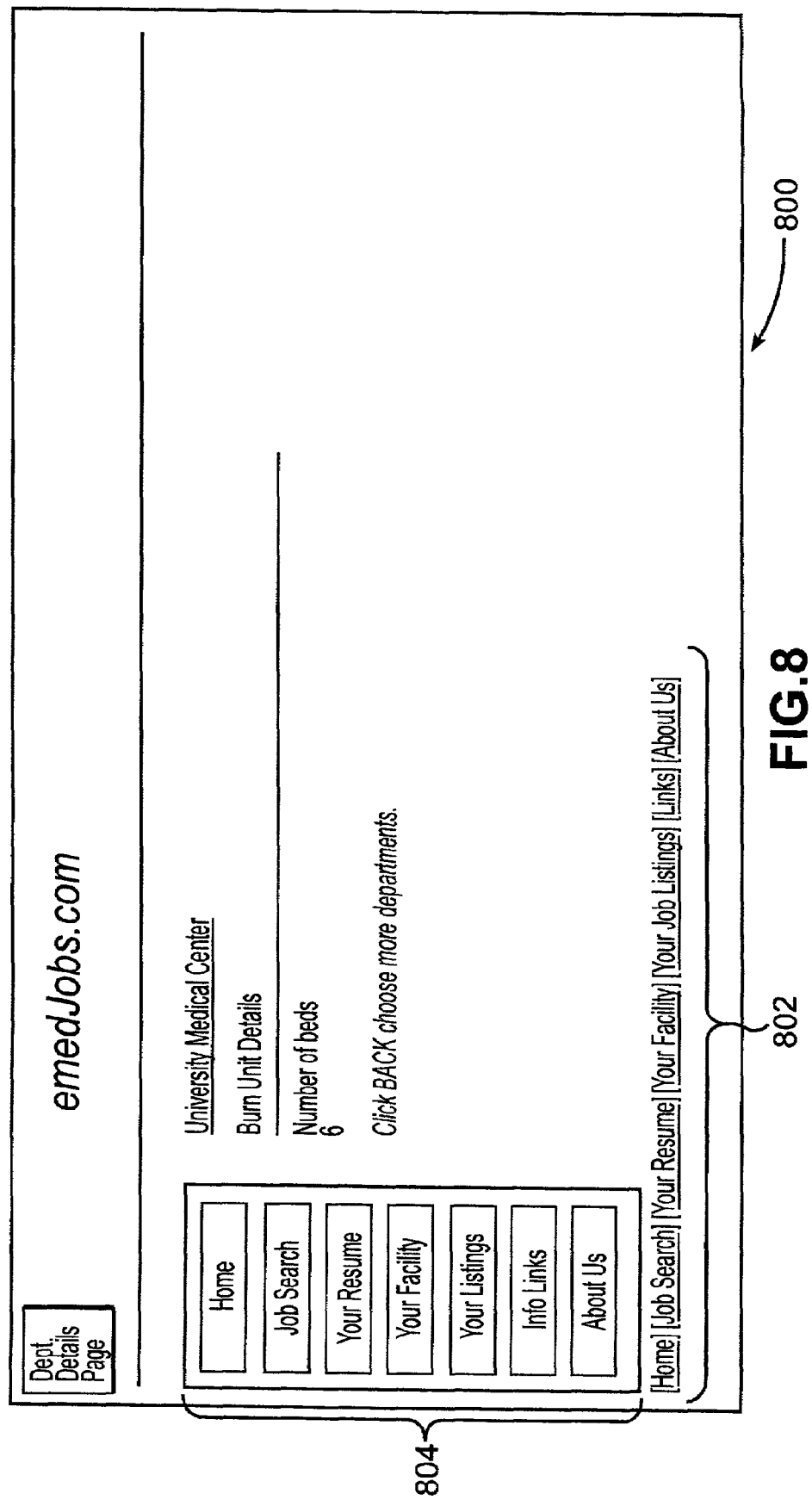

In step 320, the applicant clicks on a department title 702 and the website returns a department details page 800, as shown in FIG. 8. Department details page 800 provides more detailed information about the department, e.g., number of beds. Again, the page organizes the information in a uniform manner to make the applicant's review easier.

At the end of this search or at any point during the search, the applicant can return to previous screens by clicking the menu buttons 804 or text 802 listed on this (FIG. 8) and every other page. Alternatively, the applicant can use the "go to" or "back and forward" features of an Internet browser software.

Figure 9:
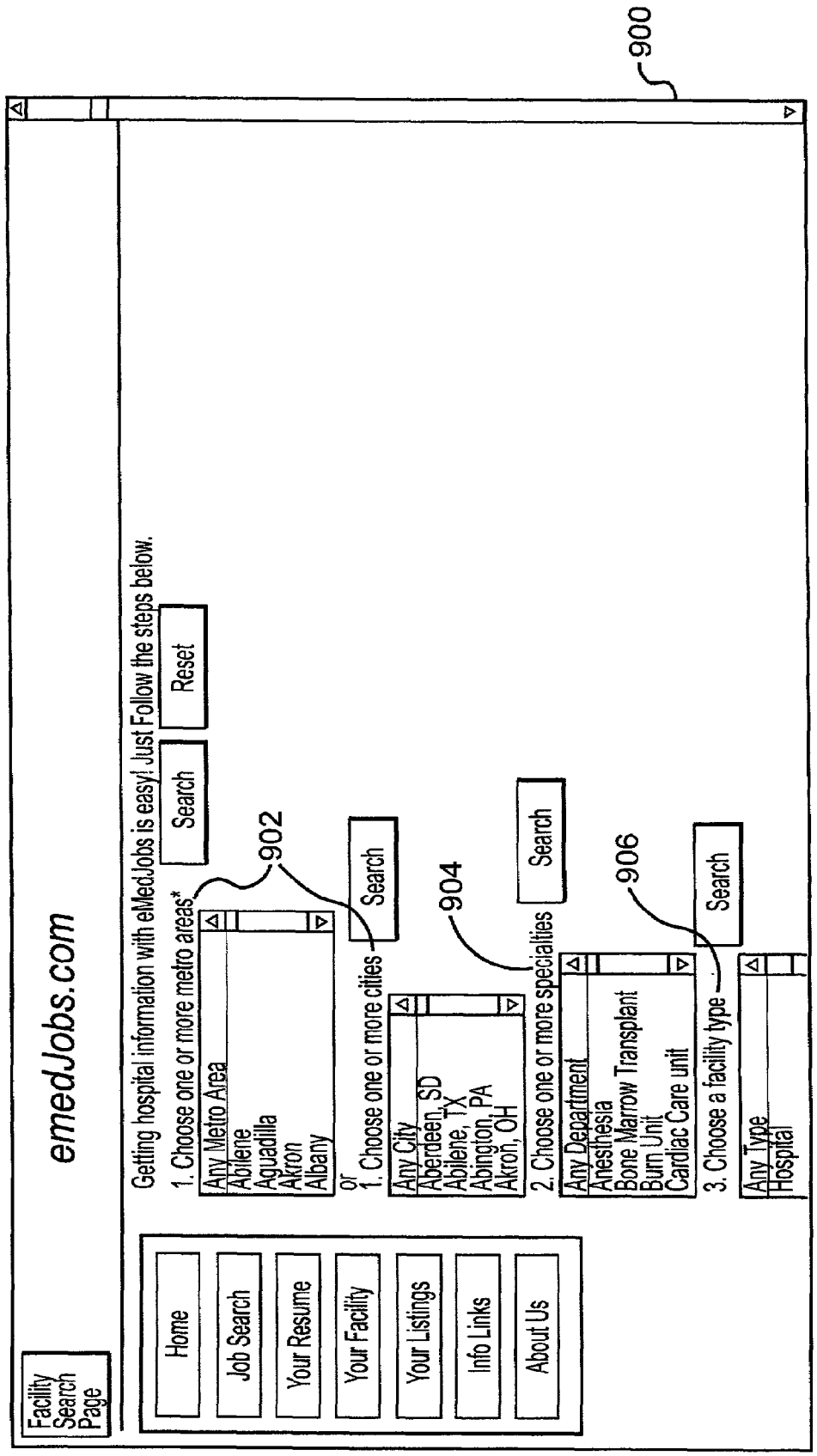

Returning to the home page, in step 322 of FIG. 3, the applicant chooses to search hospital and facility information (by clicking on text 218 in FIG. 2b). In response, the website returns a facility search page 900, as shown in FIG. 9. Facility search page 900 prompts the applicant to choose one or more metro areas or one or more cities 902, and one or more specialties 904 and one or more facility types 906. An applicant does not necessarily have to make a selection for every field. However, the more criteria the applicant specifies, the more focused the search is and the fewer facility listings are returned.

In step 324, the applicant makes the desired selections and clicks search. In response, the website searches the employer information database in accordance with the search criteria chosen by the applicant. The employer information database contains information on all employers in a given field, e.g., healthcare facilities, and not solely the employers participating in the employment service. As shown in FIG. 10, the website returns a facility results page 1000 listing the corresponding facilities 1002. The listings include data such as the name, city, state, and size of the employer. Facility results page 1000 prompts the applicant to scroll or browse through the listings by clicking arrow buttons 1004 and requests that the applicant click on a facility listing for more details.

In step 326, the applicant clicks on a facility on the list. In step 328, the website returns a facility details page like the screen shown in FIG. 7 and described above for step 318. The screen lists departments of the facility, one of which the applicant chooses (clicks on). In step 330, the website returns a department details page like the screen shown in FIG. 8 and described above for step 320.

Returning to the home page, in step 332, to enter or edit her résumé, the applicant clicks on button 216 or text 217 in FIG. 2b. In step 334, the website displays a login page that requests the applicant's user identification and password. The applicant receives this user identification and password when registering for the service. This secure access ensures that persons other than applicant cannot tamper with the information. In step 336, the website presents an edit profile page that lists the résumé information in fields and allows the applicant to enter information into each field or edit the information in each field. The fields correspond to the structure of the résumé database and entries by the applicant are stored in the résumé database.

In the preferred embodiment of the present invention, data entered through the edit profile page is saved temporarily before being stored permanently in the résumé database. This holding period allows the employment service provider to review the data for accuracy and correct form. In addition, the employment service provider ensures that field descriptions comply with uniform descriptions so that the search functions work properly.

Figure 11A:
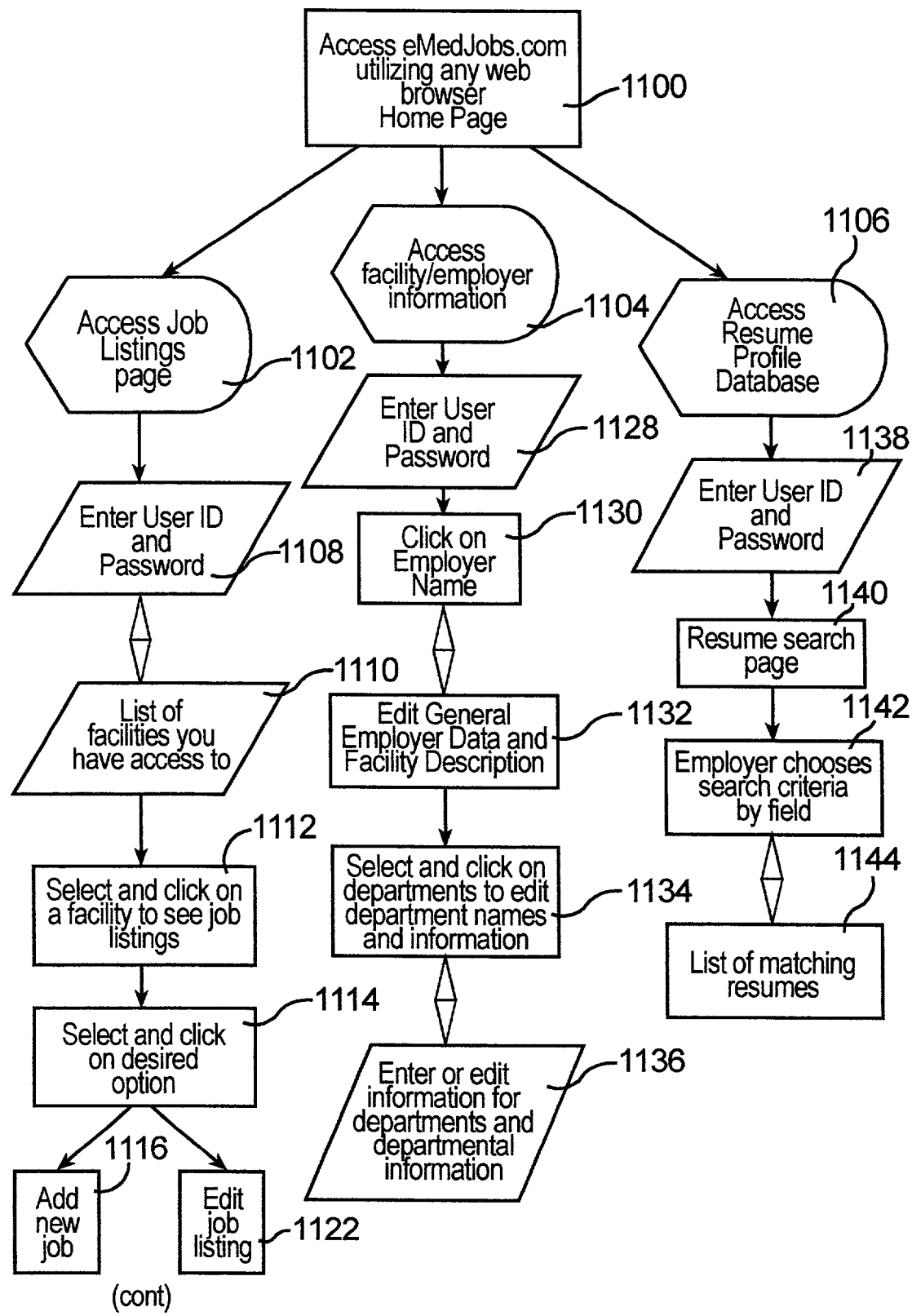
FIGS. 11a and 11b are a flowchart outlining a method for access by an employer, according to a representative embodiment of the present invention.

Employer:

FIG. 11a is a flowchart illustrating the ways in which an employer can navigate through the website and interface with the databases. (FIG. 3a shows the legend for symbols used in the flowcharts in this application.) In FIG. 11a, step 1100 represents an employer's initial access to the home page using an Internet address, e.g., eMedJobs.com. This step 1100 brings the employer to the home page illustrated in FIG. 2b. From this page, the employer can opt for one of three main functions: 1) entering job listings (step 1102) by clicking button 250 or text 251 in FIG. 2b; 2) entering employer information (step 1104) by clicking button 252 or text 253 in FIG. 2b; or 3) searching résumé profiles (step 1106) by clicking button 216 or text 217 in FIG. 2b. Other minor functions, not shown in Figure ha, include clicking on the information links button 220 or text 221, and the "about us" button 222 or text 223 shown in FIG. 2b.

If the employer chooses to enter job listings, the website in step 1108 15 presents a login page for secured access to the job listing database. The login page requests the employer's user identification and password (assigned to the employer at service initiation). When the employer enters a valid user identification and password, the system consults the job listing database for the facilities and listings corresponding to the employer.

In step 1110, the website displays a facilities page that list facilities to which the employer has access and prompts the employer to click on a facility to see the listings associated with that facility. The employer can scroll through and browse this facilities page using arrow buttons.

Figure 11B:
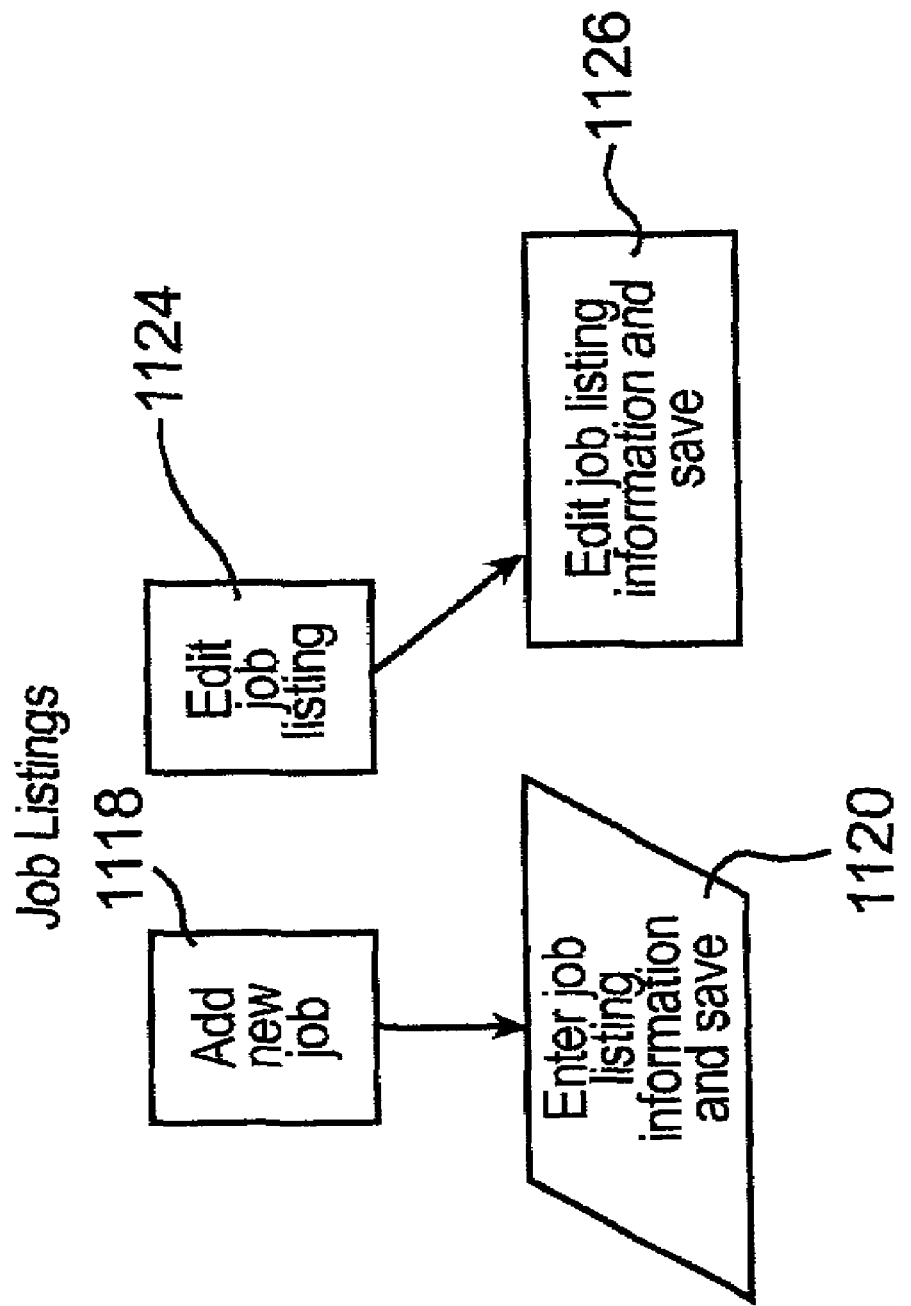

In step 1112, the employer selects and clicks on a facility to see the associated job listings. In response, in step 1114, the website returns a list of the openings for the facility and prompts the employer to choose one of two options: 1) add a new job listing or 2) edit an existing job listing. If the employer elects to create a new job listing, in step 1116 (FIG. 11b), the website presents a job listing data entry page with empty data fields. In step 1118 (FIG. 11b), the employer enters information into each field, and in step 1120 (FIG. 11b), the website saves the job listing data in the job listing database.

Figure 12C:
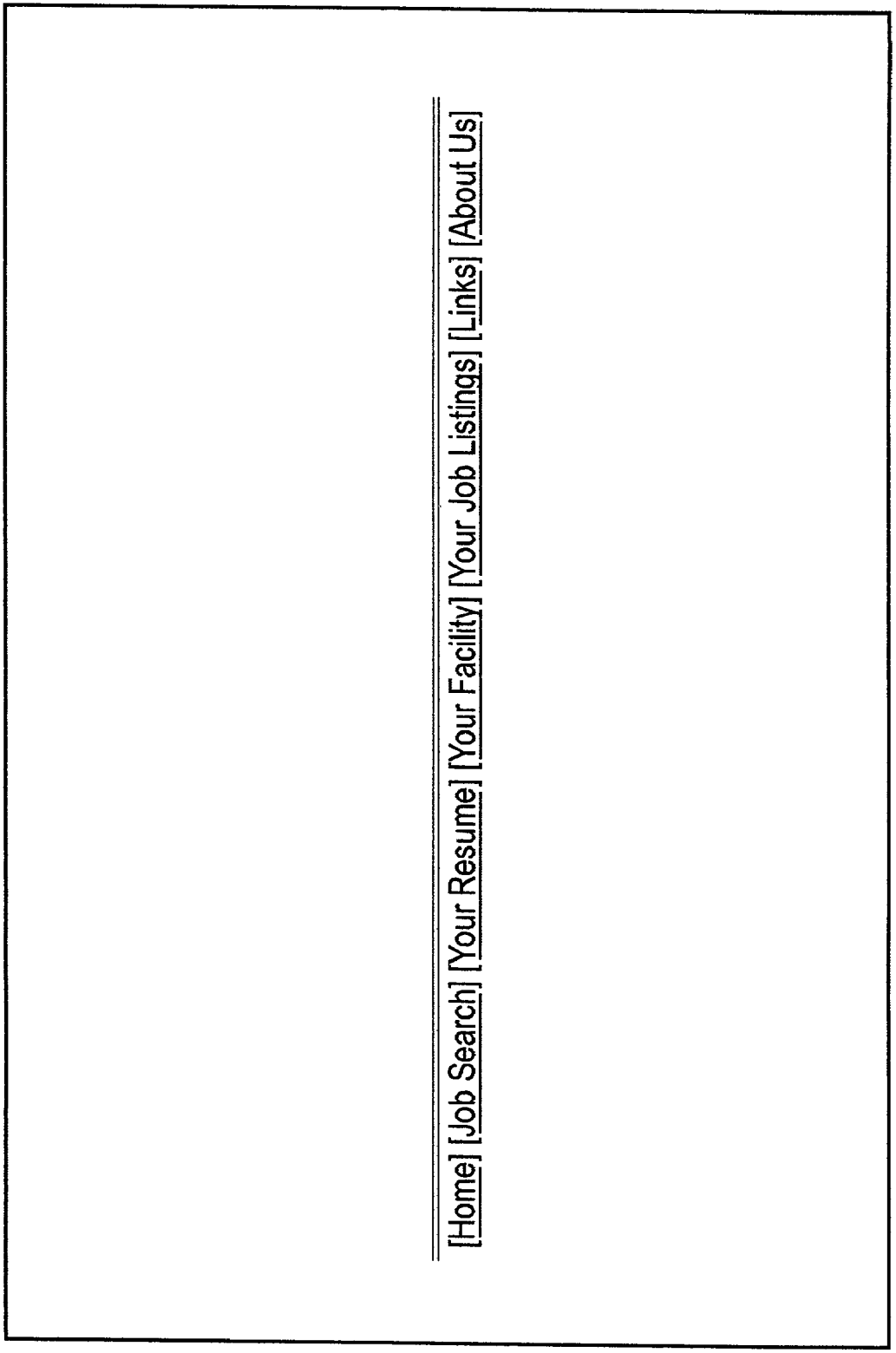
Figure 13B:
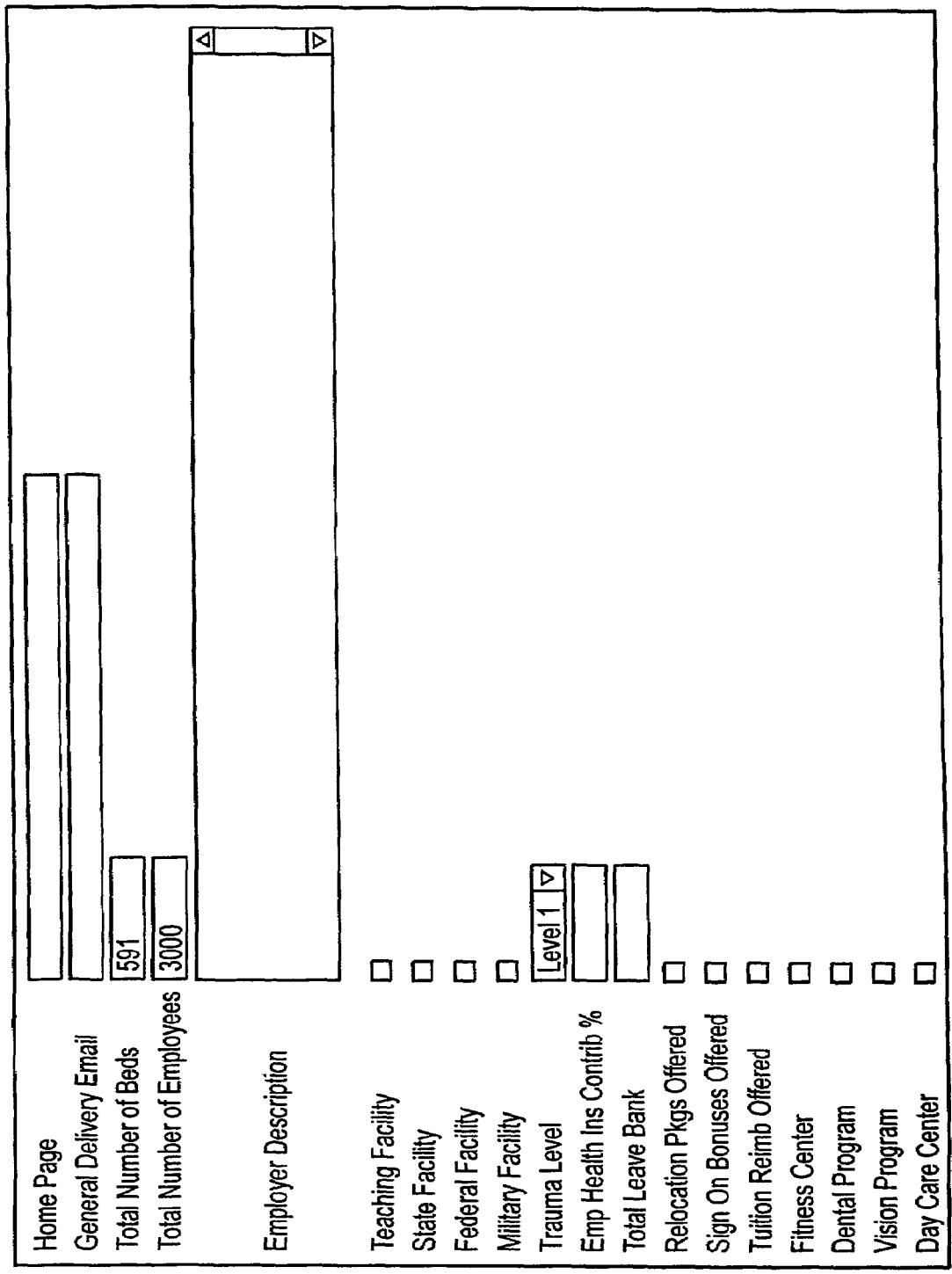

If the employer chooses, in step 1122 (FIG. 11a), to edit an existing job listing, the website locates the listing in the job listing database and presents the current information for each data field. FIGS. 12a-12c illustrate the preferred embodiment of the web page through which the job opening is edited. In step 1124 (FIG. 11b), the employer edits the fields as desired, and in step 1126, the website replaces the previous file in the job listing database with the new, updated job listing information.

In the preferred embodiment, before information is saved to job listing database in steps 1120 and 1126, the information is temporarily held for review by the employment placement service. In this manner, the employment placement service can verify that the content of the entries is accurate and matches the required search categories.

Returning to the home page shown in FIG. 2b and represented by step 1100 in FIG. 1 1a, the employer now chooses to enter employer information in step 1104. In response, in step 1128, the system displays a login page that prompts the employer for a user identification and password. In step 1130, after an acceptable login, the system displays a list of the employers and the employer chooses its name. Preferably, access to the employer information is secured such that one employer may not access another's information.

In step 1132, the system searches the employer information database. Upon finding the employer's entry in the database, the system displays the employer's information. FIGS. 13a-13e illustrate the preferred embodiment of the web page through which the employer information (both general information and department information) is edited. The employer can then edit the general employer data and facility description. When the entries and edits are complete, the website saves the information to the employer information database. This employer information entry page also contains options to display the more detailed department information.

In step 1134, the employer chooses to edit the department information. In response, the website again searches the employer information database and returns the appropriate information. In step 1136, the website presents a department information page through which the employer can edit and enter information. When the employer has finished entering the department information, the website saves the data to the employer information database.

Returning to the home page shown in FIG. 2b and represented by step 1100 in FIG. 11a, the employer now chooses to search applicant résumés in step 1106. This service is only available to employer subscribers of the employment service. Therefore, access is secured using user identifications and passwords. In step 1138, the employer enters the login information.

In step 1140, the website presents a résumé search page that lists the data field corresponding to the résumé database. The employer is prompted to choose types for each field. Thus, for example, if the employer is looking for registered nurses in a particular state, the employer would choose the particular state in the residence field and "registered nurse" in the type of position field. Depending on the number of fields the employer chooses, the search can be as broad or narrow as needed.

In step 1142, the employer selects the field criteria. In response, the system searches the résumé database for matching entries, and in step 1144, returns a list of applicant résumés. The employer can then record the information for each qualified applicant and contact the applicants to proceed with the hiring process.

Further Embodiments

In addition to the above-described methods, further preferred embodiments of the present invention provide additional features for employment placement. For instance, because the employment service is self-perpetuating and financed by employers, there is no advertising other than the job listings. Prohibiting advertising is advantageous to both applicants and employers because it increases the speed of the website and does not distract viewers from focusing on the objective of the website: to facilitate successful hirings.

Another feature of the present invention relates to information exchange. Once an applicant has entered a résumé, the present invention provides means to send that information to multiple employers. The applicant can edit the résumé at any time and can archive different versions of the résumé to accommodate different job searches.

In addition, both the employer and applicant can set up automatic email notification that informs the entry of an applicant or position that meets their needs. Thus, the employer can specify candidate requirements, and if a résumé is received that matches those requirements, the system automatically emails the résumé to the employer. Conversely, if the applicant can specify a desired job (e.g., by region or employer), and if a position listing is posted that meets that desired job, the system sends an email to the applicant notifying her of the opening.

Related to this automatic email notification, in accordance with another aspect of the present invention, the system saves search queries of both applicants and employers. Saving past queries in a database enables a variety of functional advantages. To begin with, a user (employer or applicant) may retrieve past queries to perform updated searches more easily. In addition, the system can compare new listings to past queries and can notify the searcher when a new listing matches his past query.

Moreover, search queries are by themselves valuable data in so far as they are indicative of what users are looking for. Through statistical analysis and other data mining techniques, the system of the present invention analyzes the saved search queries to provide information to users concerning market conditions and demand. The system can also make recommendations as to whether a bonus should be offered and, if so, in what amount.

As another feature, the employment service periodically emails employers to notify them of job listings that have been posted on the website for a long period of time without change. For example, every six months, the employment service would send a message to employers detailing job listings that have not changed for that period. The message would prompt the employer to remove or edit the postings to bring them up to date. To implement this service, the website software would search the "file save dates" in the job listing database for dates six months prior.

This email reminder would also work for employer information that must be updated, e.g., to reflect changes in hospital certifications or number of beds. Another feature of the present invention is the ability to link the website to related specialty websites. For instance, a website devoted strictly to information and data useful to intensive care unit nurses could operate through the main website but instead draw from special databases devoted to these special types of positions.

Although the above representative embodiments have been presented in the context of a web-based implementation, one of ordinary skill in the art would appreciate that certain methods of present invention apply equally well to other implementations, such as paper-based implementations. Indeed, an alternate representative embodiment provides that the broadcasting of job listings occurs by paper-based methods, for example, by distributing newspapers containing the job listings. Applicants responding to these paper-based job listings are afforded the same benefits as those described above for applicants using web-based methods.

For example, in applying for a position listed in a newspaper sponsored by the employment service provider, the applicant references the employment service provider to the employer. Then, after being hired for the position and starting employment, the employer pays the advertising fee to the employment service provider and the service provider pays the signing bonus to the applicant. This paper-based implementation can operate independently, or can operate as a complement to a web-based implementation. The paper-based implementation carries the benefit of attracting applicants who do not have Internet access. In addition, when operated as a complement to a web-based implementation, the paper-based method can familiarize paper-based applicants with the service, so that when they do acquire Internet access, they will go directly to the website of the employment service provider.

As a part of the paper-based implementation, the employment service provider provides employer information in the paper job listings themselves. Thus, the job listings provide uniform employer criteria that applicants can consider in deciding whether to apply. As another part of this paper-based implementation, the employment service exchanges applicant information between the applicants and employers using paper-based submissions from applicants. For example, an employment service provider could distribute a job listings newspaper containing a response card. The response card would prompt an applicant for the applicant information that employers require in making hiring decisions, e.g., degrees held, licenses held, and dates and places of previous employment. The card would also ask the applicant to indicate job listings for which she would like to apply. The applicant would return the response card to the employment service provider by, for example, mailing or faxing it.

Like the web-based entry of applicant information in data fields, the response card is an efficient way to capture standard applicant information that employers need in making hiring decisions. Essentially, the card should be brief and easy to fill out, and should be standardized so that it creates a profile for the applicant. Such convenience is especially valuable for healthcare professionals, who are typically very busy and do not have résumés already prepared.

Alternatively, instead of paper-based submissions, applicants could submit applicant information using other communication means. For example, an applicant could call an interactive voice response system that prompts the applicant for information and records the information.

According to another paper-based implementation of the present invention, the employment service exchanges applicant information between the applicants and employers by distributing to employers a paper containing applicant information. For example, the employment service could mail a newspaper to human resource representatives of healthcare facilities. The newspaper could list applicant profiles grouped by specialty (or, optionally, by some other profile category, such as geographic location). The applicant profiles could include, for example, the geographic area in which an applicant desires to work, the specialty skills the applicant possesses, and the years of experience the applicant has. In this manner, the employment service can present human resource representatives with searched and categorized applicant information, without requiring the human resource representatives to take the proactive steps of going online and visiting a particular website. If a human resource representative is interested in hiring an applicant listed in the newspaper, the human resource representative can contact the employment service directly (by, for example, telephone or facsimile machine), or, perhaps, can go online and access the web-based features and benefits of the present invention described above.

As mentioned above, in accordance with another embodiment of the present invention, the system can be used to allow employers to bid for the services of prospective employees. Naturally, this embodiment is useful in the context of applicants for positions in high demand. To implement this feature, the system notifies employers that an applicant satisfying certain criteria is available by, for example, posting that applicant's résumé, or through direct notification, such as by email. Interested employers can then submit bids for the applicant's time. Bids could involve a combination of compensation, bonuses, working conditions, and the like. The applicant could then select the bid they find most attractive. In this example, the decision is left to the subjective determination of the applicant.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for placing applicants into jobs comprising the steps of:

broadcasting job listings of employers to the applicants, wherein an employment placement service provider broadcasts the job listings, wherein broadcasting the job listings comprises posting the job listings on a global computer network;

denoting each job listing as being a listing for one of either a critical or a non-critical position, wherein denoting each job listing comprises:

making a preliminary determination, by the employment placement service provider, as to whether each job listing is for a critical position or a non-critical position, wherein a critical position is one that is generally in high demand and for which only a small pool of applicants exists and a non-critical position is one that is generally easy to fill; and marking, in a database, each job listing as either a critical position or a non-critical position in accordance with the preliminary determination;

identifying, using a computer, an applicant who is hired to fill a job listing of the broadcast job listings, wherein the job listing is for an employer;

if the filled job listing has been denoted as for a critical position, awarding a signing bonus to the applicant, wherein the employment placement service provider pays the signing bonus if the filled job listing has been denoted as for a non-critical position, entering the applicant in a pool of applicants for a prize drawing, wherein the pool of applicants only includes applicants that have been hired for non-critical hire positions daring a specified period;

collecting an advertising fee from the employer, wherein the employment placement service provider collects the advertising fee, wherein the advertising fee includes a fee for the employment placement service provider and a fee for the signing bonus, and wherein the employment placement service provider pays the signing bonus from the advertising fee, wherein the job listings comprise non-critical positions and critical positions, and wherein the advertising fee is paid only for the critical hire positions that are filled and no advertising fees are paid by the employer in relation to the listing or filling of non-critical positions;

allowing employers to search a database of job applicants;

storing search queries made by employers searching the database of job applicants;

analyzing the stored search queries made by employers to provide information as to demand for certain specialties or qualifications; and using the analysis of the stored search queries to determine appropriate signing bonus amounts.

2. The method of claim 1, wherein the step of identifying the applicant who is hired to fill the job listing comprises:

(i) requiring the applicant to reference the employment placement service provider when applying for the job listing; and (ii) receiving, at the employment placement service provider, a notification that the applicant was hired for the job listing.

3. The method of claim 2, wherein the applicant provides the notification.

4. The method of claim 2, wherein the employer provides the notification.

5. The method of claim 4, wherein the employer provides the notification after the employment placement service provider determines that the job listing was deleted and after the employment placement service provider questions the employer.

6. The method of claim 1, wherein the employer designates how much the signing bonus is.

7. The method of claim 1, wherein the fee for the employment placement service provider is a percentage of the fee for the signing bonus.

8. The method of claim 1, wherein the step of broadcasting comprises:

(i) notifying a group of employers that the applicant satisfies criteria of the group of employers;

(ii) accepting bids for the applicant from the group of employers; and (iii) allowing the applicant to choose a desired bid.

9. The method of claim 8, wherein a bid of the bids comprises one or more of compensation, a bonus, and a working condition.

10. The method of claim 1, wherein a job listing of the job listings comprises a title, a job number, a department name, an opening date, an employer name, an indicator of whether or not the job is part-time, a description, a job class, a job search class, a number of part-time hours, a start pay from field, a start pay to field, a number of leave days, an indicator of whether or not relocation is offered, a signing bonus amount, an amount of experience required, an amount of education required, a shift type, a flex type, an email address, a contact, a closing date, a reason closed, a date entered field, an entered by field, a last updated date field, a last updated by field, and a job id.

11. The method of claim 1, further comprising providing employer information about the employers.

12. The method of claim 11, wherein the employer information is uniform criteria for all of the employers.

13. The method of claim 11, wherein the employers are health care providers.

14. The method of claim 11, wherein the step of providing employer information further comprises providing employer information about employers that are not posting job listings on the service.

15. The method of claim 11, wherein the step of providing employer information comprises searching for an employer matching particular employer information desired by an applicant.

16. The method of claim 15, wherein if the searching does not return a matching employer, then the method further comprises the steps of:

(i) storing the particular employer information desired by the applicant;

(ii) periodically searching for the particular employer information desired by the applicant; and (iii) notifying the applicant when the searching returns a matching employer.

17. The method of claim 16, wherein the step of notifying the applicant comprises sending an email to the applicant.

18. The method of claim 16, further comprising the steps of:

storing particular employer information desired by multiple applicants; and analyzing the stored particular employer information to provide information as to demand for certain employer criteria.

19. The method of claim 11, wherein the employer information comprises an employer name, an address, an account status, a facility type, a phone number, a fax number, a home page address, an email address, a number of beds, a number of employees, a description, an indicator of whether or not a teaching facility, an indicator of whether or not a stat facility, an indicator of whether or not a federal facility, an indicator of whether or not a military facility, a trauma level, an employee healthcare insurance contribution, a total leave amount, an indicator of whether or not a relocation package is offered, an indicator of whether or not a sign on bonus is offered, an indicator of whether or not a tuition reimbursement is offered, an indicator of whether or not a fitness center is available, an indicator of whether or not a dental program is offered, an indicator of whether or not a vision program is offered, and an indicator of whether or not a day care center is available.

20. The method of claim 11, further comprising allowing the applicant to compare the job listings and the employer information.

21. The method of claim 1, further comprising limiting signing bonuses paid to the applicant to a predetermined number within a defined time period.

22. The method of claim 21, wherein the predetermined number comprises two and the defined time period comprises one year.

23. The method of claim 1, wherein the employers are hospitals, wherein the job listings include departments of the employers, and wherein the method further comprises:

receiving a search request for job listings pertaining to a specialty occupation;

identifying pertinent job listings that have departments associated with the specialty occupation; and returning search results listing the pertinent job listings.

24. The method of claim 1, wherein the fee for the signing bonus is based on whether a position of the job listing is one of in high demand and highly compensated and wherein the fee for the employment service provider is a percentage of the fee for the signing bonus.

25. The method of claim 1, further comprising allowing the applicant to access informational websites owned by the employment service provider.

26. The method of claim 1, wherein the employment placement service provider allows employers to broadcast an unlimited number of job listings for non-critical positions without charging any fees to the respective employers in relation to the broadcasting or filling of the non-critical positions.

27. A method for filling job openings comprising the steps of:
- broadcasting a plurality of job listings of employers to a plurality of applicants without charging the employers an advertising fee, wherein an employment placement service provider broadcasts the plurality of job listings and wherein broadcasting comprises posting the plurality of job listings on a global computer network;
- denoting each job listing as being a listing for one of either a critical or a non-critical position, wherein denoting each job listing comprises:
  - making a preliminary determination, by the employment placement service provider, as to whether each job listing is for a critical position or a non-critical position, wherein a critical position is one that is generally in high demand and for which only a small pool of applicants exists and a non-critical position is one that is generally easy to fill;
  - marking, in a database, each job listing as either a critical position or a non-critical position in accordance with the preliminary determination;
- identifying, using a computer, a job listing of the plurality of job listings for which an applicant of the plurality of applicants was hired, wherein the job listing is for an employer;
- charging the employer an advertising fee only for the job listing for which the applicant was hired and only if the job listing for which the applicant was hired was for a critical position, wherein the employer pays the advertising fee to the employment placement service provider;
- if the filled job listing has been denoted as for a critical position, paying the applicant a signing bonus, wherein the employment placement service provider pays the signing bonus from the advertising fee;
- if the filled job listing has been denoted as for a non-critical position, entering the applicant in a pool of applicants for a prize drawing, wherein the pool of applicants only includes applicants that have been hired for non-critical hire positions during a specified period, and wherein no fees are collected for either the listing or the filling of a non-critical position;
- allowing employers to search a database of job applicants;
- storing search queries made by employers searching the database of job applicants;
- analyzing the stored search queries made by employers to provide information as to demand for certain specialties or qualifications; and
- using the analysis of the stored search queries to determine appropriate signing bonus amounts.

28. The method of claim 27, wherein the employment placement service provider broadcasts the plurality of job listings, and wherein the step of identifying the job listing comprises:
  (i) requiring the applicant to reference the employment placement service provider when applying for the job listing; and
  (ii) receiving, at the employment placement service provider, a notification that the applicant was hired for the job listing.

29. The method of claim 28, wherein the applicant provides the notification.

30. The method of claim 28, wherein the employer provides the notification.

31. The method of claim 30, wherein the employer provides the notification after the employment placement service provider determines that the job listing was deleted and after the employment placement service provider questions the employer.

32. The method of claim 27, wherein the employer designates how much the signing bonus is.

33. The method of claim 32, wherein the employment placement service provider broadcasts the plurality of job listings, identifies the job listing for which an applicant of the plurality of applicants was hired, and charges the employer the advertising fee.

* * * * *